(12) United States Patent
Priness et al.

(10) Patent No.: US 11,887,164 B2
(45) Date of Patent: Jan. 30, 2024

(54) PERSONALIZED INFORMATION FROM VENUES OF INTEREST

(71) Applicant: Microsoft Technology Licensing, LLC, Redmond, WA (US)

(72) Inventors: Ido Priness, Redmond, WA (US); Dikla Dotan-Cohen, Redmond, WA (US); Haim Somech, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 276 days.

(21) Appl. No.: 14/721,259

(22) Filed: May 26, 2015

(65) Prior Publication Data

US 2016/0350812 A1    Dec. 1, 2016

(51) Int. Cl.
*G06Q 30/0251* (2023.01)
*G06Q 50/10* (2012.01)

(52) U.S. Cl.
CPC ..... *G06Q 30/0269* (2013.01); *G06Q 30/0264* (2013.01); *G06Q 50/10* (2013.01)

(58) Field of Classification Search
CPC ..... H04W 4/021; H04W 4/029; H04W 4/023; H04W 4/06; H04W 4/02; H04W 4/21;
(Continued)

(56) References Cited

U.S. PATENT DOCUMENTS 8,477,693 B1    7/2013   Knoop et al.
8,639,223 B1    1/2014   Hu
(Continued)

FOREIGN PATENT DOCUMENTS

CN    103310350 A    9/2013
CN    103345512 A    10/2013
(Continued)

OTHER PUBLICATIONS

"Second Written Opinion Issued in PCT Application No. PCT/US2016/034217", dated Apr. 7, 2017, 8 Pages.
(Continued)

*Primary Examiner* — Chinyere Mpamugo
(74) *Attorney, Agent, or Firm* — Shook, Hardy & Bacon L.L.P.

(57) ABSTRACT

Personalized information from venues of interest to a user is provided to the user. The information may comprise messages, notifications, or other information determined to be relevant to the user, and may be timely provided to the user in an appropriate format such that the user is better able to respond to the information. A set of venues that are relevant to the user and corresponding information sources associated with the venue are determined. Information published by these sources may be analyzed for relevance to the user, and the relevant information items may be provided to the user via notifications or applications and services. Further, the notifications may be scheduled for presentation to the user at appropriate times, such as prior to a predicted visit of the venue. One embodiment includes a venue-information clearinghouse for receiving information from venues and making it available for user applications or services.

20 Claims, 7 Drawing Sheets

(58) Field of Classification Search
CPC ........ H04W 76/27; H04L 51/26; H04L 51/24;
H04L 69/329; H04L 67/26; H04L 67/04;
H04L 67/18; H04L 67/36; H04L 29/06;
H04L 51/04; H04L 51/043; H04L 51/20;
H04L 63/08; H04L 67/24; H04L 67/306;
H04L 67/10; H04L 67/22; H04L 67/322;
G06Q 40/04; G06Q 30/06; G06Q 30/02;
G06Q 20/105; G06Q 20/347; G06Q
20/349; G06Q 20/363; G06Q 10/107;
G06Q 30/0269; G06Q 50/10; G06Q
30/0264; G06Q 10/1095; G06Q
30/0207–0277; G07F 7/08; G07F 7/0806;
G07F 7/02; G07F 7/0833; G06F 16/9535;
G06F 16/954; G06F 30/20; G06F
3/04883; G06F 16/2471; G06F 16/24535;
G06N 20/00; G10L 15/1815; G10L
15/222; G10L 2015/088; G10L 2015/223;
G10L 25/78
See application file for complete search history.

(56) References Cited

U.S. PATENT DOCUMENTS

| | | | |
|---|---|---|---|
| 8,676,887 B2 | 3/2014 | Kim et al. | |
| 2005/0149496 A1 | 7/2005 | Mukherjee et al. | |
| 2006/0004702 A1* | 1/2006 | St. John | G06F 16/954 |
| 2007/0004385 A1* | 1/2007 | Horvitz | H04L 51/14 |
| | | | 455/414.1 |
| 2008/0004953 A1* | 1/2008 | Ma | G06Q 30/02 |
| | | | 705/14.41 |
| 2009/0325556 A1* | 12/2009 | Lee | G06Q 30/0269 |
| | | | 455/414.2 |
| 2010/0228582 A1 | 9/2010 | King et al. | |
| 2011/0125769 A1 | 5/2011 | Rodrigues | |
| 2012/0100867 A1 | 4/2012 | Liang et al. | |
| 2012/0158502 A1 | 6/2012 | Chung et al. | |
| 2012/0252418 A1* | 10/2012 | Kandekar | H04W 4/021 |
| | | | 455/414.1 |
| 2013/0073473 A1 | 3/2013 | Heath | |
| 2013/0117254 A1 | 5/2013 | Manuel-Devadoss et al. | |
| 2013/0204813 A1 | 8/2013 | Master et al. | |
| 2013/0298030 A1* | 11/2013 | Nahumi | H04W 4/023 |
| | | | 715/733 |
| 2013/0311577 A1 | 11/2013 | Foreman et al. | |
| 2014/0006399 A1* | 1/2014 | Vasudevan | G06F 17/30867 |
| | | | 707/737 |
| 2014/0040362 A1 | 2/2014 | Le | |
| 2014/0278987 A1* | 9/2014 | Busch | H04W 4/02 |
| | | | 705/14.54 |
| 2015/0317320 A1* | 11/2015 | Miller | G06F 16/24578 |
| | | | 707/728 |
| 2016/0260296 A1* | 9/2016 | Shirriff | G06Q 10/109 |

FOREIGN PATENT DOCUMENTS

| | | | | |
|---|---|---|---|---|
| GB | 2506575 A | * | 4/2014 | ........... G06Q 10/101 |
| GB | 2506575 A | * | 4/2014 | ........... G06Q 10/101 |

OTHER PUBLICATIONS

Huang, et al., "WS-Messenger: a Web Services-based Messaging System for Service-oriented Grid Computing", In Proceedings of Sixth IEEE International Symposium on Cluster Computing and the Grid, May 16, 2006, 8 page.

"International Search Report and Written Opinion Issued in PCT Application No. PCT/US2016/034217", dated Jul. 18, 2016, 13 Pages.

Papliatseyeu, et al., "Mobile Habits: Inferring and Predicting User Activities with a Location-Aware Smartphone", In Proceedings of 3rd Symposium of Ubiquitous Computing and Ambient Intelligence, vol. 51, Jan. 2009, 11 Pages.

Scellato, et al., "NextPlace: A Spatio-Temporal Prediction Framework for Pervasive Systems", In Proceedings of 9th International Conference on Pervasive Computing, Jun. 12, 2011, 18 Pages.

"International Preliminary Report on Patentability Issued in PCT Application No. PCT/US2016/034217", dated Aug. 11, 2017, 9 Pages.

* cited by examiner

PERSONALIZED INFORMATION FROM VENUES OF INTEREST

BACKGROUND

People typically have interests in many different venues, including businesses, schools, organizations, places, or online communities and interest groups, for example. These venues often publish information or announcements; for example, a business might publish changes in its opening hours, or a school might publish an announcement about a field trip or special event. Sometimes this information may be published on a website associated with the venue or sent out to all users via email or text messages regardless of whether the information is relevant to a particular user. Further, in many cases, even where the information is relevant to the user, the user may not see the information, or may forget it by the time the user visits or interacts with the venue. This can lead to user disappointment and frustration. Still further, reading every message or notification published by every venue of interest to the user is not an efficient use of time because much of the information will be irrelevant to the user.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the invention are directed towards systems and methods for providing information from venues that are of interest to a user. In particular, embodiments may determine a set of venues that are relevant to a particular user and corresponding information sources associated with the venue. Information published by or otherwise received from these sources may be analyzed for relevance to the user. Relevant information items may be provided to the user via notification(s) or applications and services. Notifications may be scheduled or determined to be presented to the user at appropriate times, such as during or prior to a predicted visit of the venue, upon a determination that a user is approaching the venue location, accessing the venue (such as for an online venue), otherwise communicating with or interacting with the venue, or able to respond the notification. In some cases, information items may be analyzed for relevance to the user and for urgency, which may be used for determining notification conditions or logic used for specifying whether, when, and how (including how often) to present the information to the user. Information items may also be analyzed to determine a confidence weight or score regarding their accuracy, urgency, and/or relevance to the user, which also may be used for determining notification conditions or logic for presenting the information to the user.

Some embodiments provide a venue-information source clearinghouse, which may be used for receiving published information from venues. For example, in one embodiment, a common application programming interface (API) is utilized such that venues may provide information to the clearinghouse as a service to their customers, members, or users. In this way, the clearinghouse provides a repository of information from venues. Applications and services, such as a user's personal assistant application, may access the clearinghouse, determine those venues and corresponding information items relevant to the user, extract the information, and consume it, such as via notification(s), automatically populating the user's calendar with the information, adding tasks, shopping list items, etc.

Accordingly, aspects of the present disclosure relate to service content tailored to venues of interest to a user. The term "venue" is used broadly herein to include nearly any entity for which a user may have potential interest and desire to know of announcements, messages, or information updates. By way of example and not limitation, a venue may include a business, school, organization, club, physical place or location (such as a park, stadium, or facility), virtual location, online community, interest group, government, municipality, or similar entity. By identifying sources of information associated with these venues, content that is relevant to users may be determined and timely provided so as to tailor or personalize the content for the user.

As will be further described, in one embodiment, user data is received from one or more data sources. The user data may be received by collecting user data with one or more sensors or components on user device(s) associated with a user, such as described herein. A set of venues of interest to the user may be determined based on the received user data. In particular, the user data may be used to determine venues that are relevant to the user, which may be determined based on venues frequented by the user, patterns of user interaction with venues, or other user-activity patterns associated with venues, for example.

For a relevant venue, a set of one or more information sources corresponding to the venue may be determined. In some cases, the information sources may be determined from inference based on semantic knowledge and user data, such as user activity or communications received by the user. The set of information sources may be monitored and information items extracted for evaluation to provide the information to the user. In an embodiment, features are extracted from information items and used for evaluating for relevance to the user and/or urgency, which may be determined as a relevance score and an urgency score, respectively.

Notification content may be generated based on the information item and its determined relevance and/or urgency. The notification content may be provided to the user via a notification or may be consumed by an application or service of the user, such as a calendar or scheduling application. In this way, embodiments of the invention can provide a user with information from venues of interest to the user that is personalized and provided in a timely manner.

BRIEF DESCRIPTION OF THE DRAWINGS

Aspects of the invention are described in detail below with reference to the attached drawing figures, wherein.

DETAILED DESCRIPTION

Figure 1:
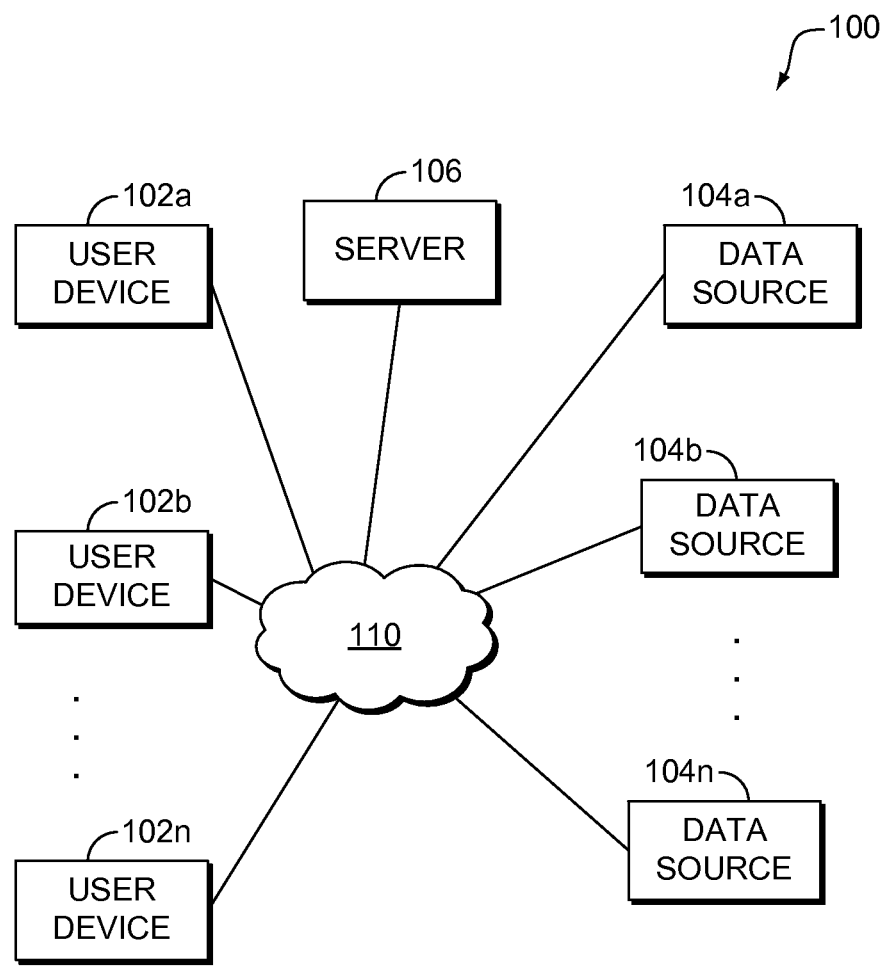
FIG. 1 is a block diagram of an example operating environment suitable for implementing aspects of the invention.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, providing a user with information from venues of interest to the user that is personalized and provided in an appropriate manner. Embodiments may determine a set of venues that are relevant to a particular user and corresponding information sources associated with each venue. These information sources may be monitored, and from them, information determined to be relevant to the user may be extracted and timely provided to the user.

As further described herein, in some embodiments, the information sources may be weighted with a trust score, based on trust or confidence of the particular source for providing information related to the corresponding venue of interest. Some embodiments determine the confidence based on feedback from the user or other users, or venue-source logic. For example, an official website associated with a venue may have a higher trust score than a social media post. Further, some embodiments may use the trust score (or similar venue-information source weighting) for reconciling information items from different sources and/or for determining a confidence weighting or score for the information from the particular source.

Information that is published, made available, or otherwise received from these sources may be analyzed for relevance to the user. In some embodiments, contextual information associated with the published information may be identified and also used for determining relevance. Based on relevant information items, and contextual information, in some embodiments, notification content may be determined and used for providing the information to the user, such as via a notification, an API where it may be consumed by an application or service for the user or other users, or providing the information to an application or service such as calendar application associated with the user.

Notification(s) may be scheduled or determined to be presented to the user at an appropriate time, such as during or prior to a predicted visit of the venue, upon a determination that a user is approaching the venue location, accessing the venue (such as for an online venue), otherwise communicating with or interacting with the venue, or able to respond the notification. In some cases, information items are analyzed for relevance to the user and for urgency, which may be used for determining notification conditions or logic for specifying a format for providing the information to the user, such as whether, when, and how (including how often) a notification should present the information to the user. In particular, in some embodiments, information items may be analyzed to determine features (such as entities, dates and times, keywords, and relationships between features). The features may be extracted and used for determining relevance and urgency.

Additionally, contextual information may also be used for determining the relevance and urgency. In an embodiment, the notification content includes notification logic specifying the format of notification(s) (e.g., how notification(s) may be provided to the user) and/or the timing or frequency of the notification presentation, which may be determined based on contextual information associated with the venue information item(s) including, for example, the urgency. Thus, for example, a notification may be determined to be presented more than once and/or in a different format (such as a pop-up, audio message, start-of-day notification, entry into the user's calendar, etc.) based on the urgency of the information item(s). Contextual information associated with the venue information item(s) also may be used for determining supplemental content to provide to the user in the notification, as described herein.

Information items may be further analyzed to determine a confidence weight or confidence score regarding their accuracy, urgency, and/or relevance to the user. The confidence score also may be used for determining notification conditions or logic for presenting the information to the user. In some embodiments, the confidence score may be based at least in part on the information source(s) providing the information item, the trust score associated with that particular source, the consistency with information from other sources and/or the number of sources providing information similar to the information item, the frequency with which the information is published or communicated, and/or user feedback about the information including feedback from other users. For example, user feedback is determined regarding the relevance, urgency, or accuracy of the information items provided to the user, which may be inferred, based on user response to a notification with the information item, or explicitly provided by prompting the user for feedback. In an embodiment, a user may be asked, within or following a notification, whether the information provided in the notification is relevant to the user.

Some embodiments further contemplate a venue-information source clearinghouse, which may be used for receiving published information from venues. For example, in one embodiment, a common API is utilized such that venues may provide information to the clearinghouse as a service to their customers, members, or users. In this way, the clearinghouse provides a repository of information from venues. The information may be structured, tagged, labeled, or otherwise organized to facilitate interpreting the information. For example, the information may include a field or tag for an expiration time indicating that the information is no longer relevant after that time. Similar fields may include dates, times, notification categories (such as changes to opening hours or times, special events, warnings, for example), etc. Applications and services, such as a user's personal assistant application, may access the clearinghouse, determine those venues and corresponding information items relevant to the user, extract the information, and consume it, such as via notification(s), automatically populating the user's calendar with the information, adding tasks, shopping list items, etc.

In certain respects, aspects of the present disclosure relate to service content tailored to venues of interest to a user. The term "venue" is used broadly herein to include nearly any entity for which a user may have potential interest and desire to know of announcements, messages, or information updates. By way of example and not limitation, a venue may include a business, school, organization, club, physical place or location (such as a park, stadium, or facility), virtual location, online community, interest group, government, municipality, or similar entity. By identifying sources of information associated with these venues, content that is relevant to users may be determined and timely provided so as to tailor or personalize the content for the user.

Accordingly, at a high level, in one embodiment, user data is received from one or more data sources. The user data may be received by collecting user data with one or more sensors or components on user device(s) associated with a user. Examples of user data, which is further described in connection to component 214 of FIG. 2A, may include location information of the user's mobile device(s), user-activity information (e.g., app usage, online activity, searches, calls), application data, contacts data, calendar and social network data, or nearly any other source of user data that may be sensed or determined by a user device or other computing device. The received user data may be monitored and information about the user may be stored in a user profile. In one embodiment, a user knowledge base (such as described in connection to user semantic knowledge component 246 of FIG. 2A) is utilized for storing user data about the user. In one embodiment, user data within certain a time frame (such as 90 days, 6 months, or 2 years) is monitored and used for determining entities of interest to the user, in order to account for changes in user interest. Likewise, in one embodiment, where user data indicates that a user has no interaction with a particular venue for a time frame, such as 1 year, it may be determined that the user is no longer interested in the venue.

A set of venues of interest to the user may be determined from the received user data. In particular, the user data may be used to determine venues that are relevant to the user, which may be determined based on venues frequented by the user, patterns of user interaction with venues, or other user-activity patterns associated with venues, for example. Such patterns may include, by way of example and not limitation, a user visiting a particular school every morning; a church for one hour every Sunday; a particular grocery store once per week; a gym for 45 minutes every Monday, Wednesday, and Saturday; an online meeting at 2:00 pm on the first Friday of every month; a credit card payment website on the last day of every month; stopping at the same hardware store on the way home from work several times each month; repeated visits to the same gas station to fill up a car with gas; or similar patterns of user interactions with venues.

In some embodiments, venue logic or semantic information about geographic locations visited by the user may be used to determine likely venues at locations where more than one venue is present, such as a school that is adjacent to a movie theater. For example, where user data indicates that the user likely has a 10-year-old daughter and that the user has a pattern of visiting the same location every morning at 7:45 am and afternoon at 3:00 pm, but the location includes a school and a theater, it may be determined that the venue of interest to the user is more likely the school. Additionally, in some cases, a user may explicitly indicate that a particular venue is important, and in some embodiments; for example, where user data indicates that a venue may be relevant to a user, the user may be asked whether the user desires to receive messages or information updates from the venue.

From the relevant venues, a set of information sources corresponding to a venue may be determined. In some cases, the information sources may be determined from inference based on semantic knowledge and user data, such as user activity or communications received by the user. Examples of information sources may include, by way of example and not limitation: webpages, message boards, bulletins, email, text messaging, instant messaging and similar communications (including communications of the user's social media friends or other users interested in the same venue), social media feeds, press releases, radio or television announcements (including closed captioning data) or similar broadcasts, or nearly any other source of information about the venue. In some embodiments, venue-source logic (such as rules, conditions, and associations) may be used for identifying likely sources of information corresponding to each of the venues. For example, venue-source logic may specify rules indicating that email received by the user having a domain name that is the same as the entity (or associated with the entity) may be determined to be related to the entity; similarly, the official website or social media pages associated with the entity also may be determined to be corresponding information sources. Venue information sources may also be learned from the user, such as by a training session or prompting the user to provide or confirm likely information sources, or may be inferred from user activity (including activity of other users who are also interested in the same venue), such as websites frequently visited or emails frequently received from the same entity. For example, where a user is interested in a particular school, venue source information from other users interested in that school (such as other parents with children at the school) may be determined based on user activity of those users.

The set of information sources may be monitored and information items extracted for evaluation to provide the information to the user. In particular, features may be extracted from information items and used for evaluating for relevance to the user and/or urgency. For example, features may include keywords or phrases, entities, dates and times, and/or relationships between these features. As will be further described herein, in one embodiment, relevance may be determined based on a comparison of the features with a user knowledge base, and urgency determined based on date/time features. In some embodiments, a relevance score and an urgency score are determined. Further, in some embodiments, a confidence score also may be determined, which may provide an indication of the accuracy or certainty of the information item. Contextual information related to the venue information item may also be determined from the information item and/or from the user data (including patterns determined from it) and may be used to determine relevance or urgency associated with the information item. In some embodiments, contextual information may also be determined from user data of other users (i.e., crowdsourcing data), such as users that are also interested in the particular venue. In such embodiments, the data may be de-identified or otherwise used in a manner to preserve privacy of the other users.

Notification content may be generated based on the information item, its determined relevance and/or urgency, and/or in some cases the confidence score, or other contextual information, and may further include supplemental content for assisting the user in addressing the information item. For example, notification content generated based on an information item indicating that a grocery store visited by the user every Tuesday will be closed on next Tuesday may include supplemental content for other nearby grocery stores that will be open on next Tuesday. The notification content may be provided to the user via a notification or may be consumed by an application or service of the user, such as a calendar or scheduling application.

Some embodiments further include using user data from other users with interests in the same venue (such as crowdsourcing data) for determining venue information sources, relevance, urgency or confidence, and/or relevant supplemental content for providing to the user. Additionally, some embodiments of the invention may be carried out by a personal assistant application or service, which may be implemented as one or more computer applications, services, or routines, such as an app running on a mobile device or the cloud, as further described herein.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Figure 2A:
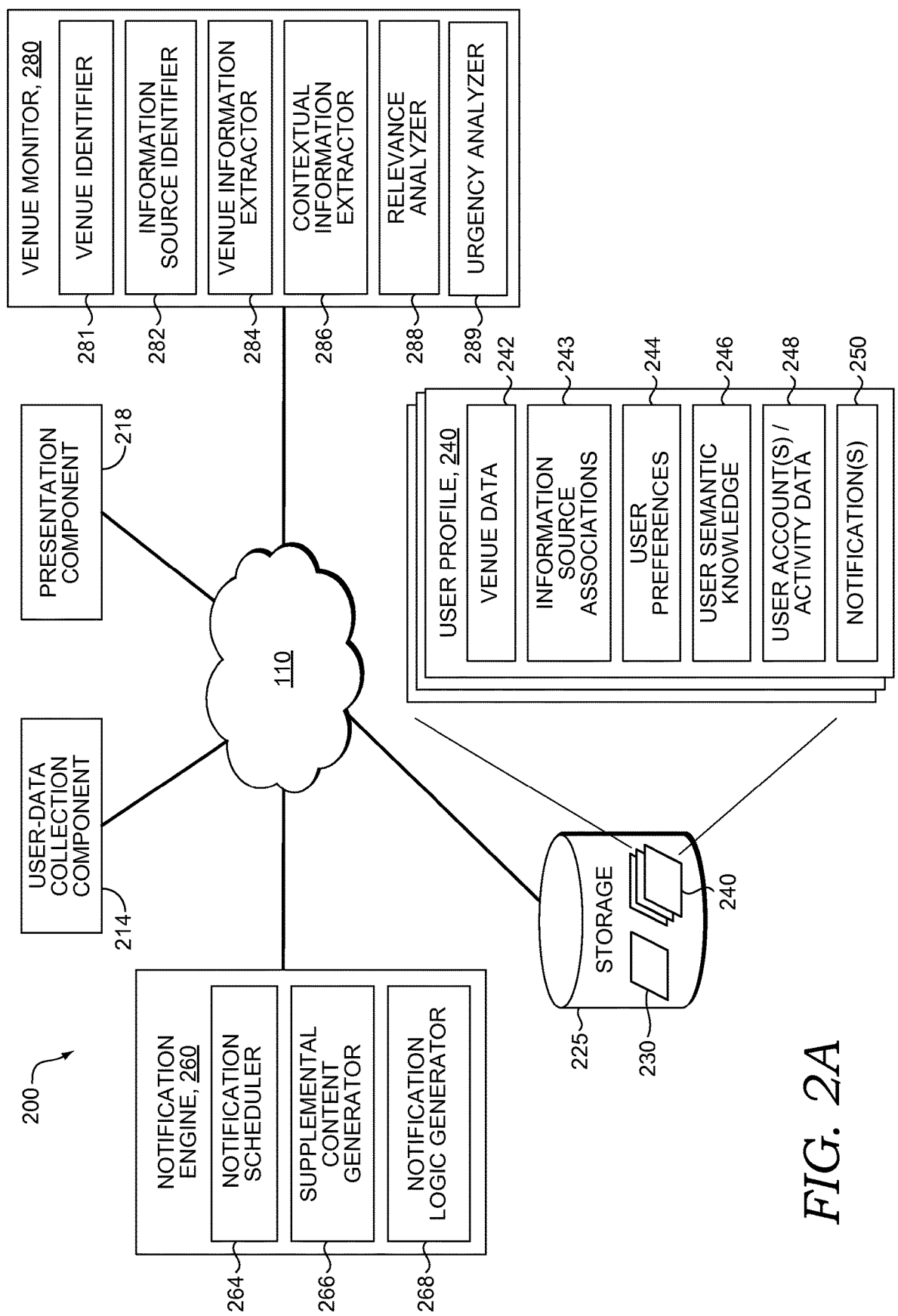
FIG. 2A is a diagram depicting an example computing architecture suitable for implementing aspects of the invention.

Data sources 104a and 104b through 104n may comprise data sources and/or data systems, which are configured to make data available to any of the various constituents of operating environment 100, or system 200 described in connection to FIG. 2A. (For example, in one embodiment, one or more data sources 104a through 104n provide (or make available for accessing) user data to user-data collection component 214 of FIG. 2A.) Data sources 104a and 104b through 104n may be discrete from user devices 102a and 102b through 102n and server 106 or may be incorporated and/or integrated into at least one of those components. In one embodiment, one or more of data sources 104a though 104n comprise one or more sensors, which may be integrated into or associated with one or more of the user device(s) 102a, 102b, or 102n or server 106. Examples of sensed user data made available by data sources 104a though 104n are described further in connection to user-data collection component 214 of FIG. 2A Operating environment 100 can be utilized to implement one or more of the components of system 200, described in FIG. 2A, and system 201, described in FIG. 2B, including components for collecting user data, monitoring events, generating notification content, and/or presenting notifications and related content to users. Referring now to FIG. 2A, with FIG. 1, a block diagram is provided showing aspects of an example computing system architecture suitable for implementing an embodiment of the invention and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 214, venue monitor 280, notification engine 260, presentation component 218, and storage 225. Venue monitor 280 (including its components 281, 282, 284, 286, 288, and 289), notification engine 260 (including its components 264, 266, and 268), user-data collection component 214, and presentation component 218 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of system 200 are associated with one or more personal assistant applications, services, or routines. In particular, such applications, services, or routines may operate on one or more user devices (such as user device 102*a*), servers (such as server 106), may be distributed across one or more user devices and servers, or be implemented in the cloud. Moreover, in some embodiments, these components of system 200 may be distributed across a network, including one or more servers (such as server 106) and client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2A, user-data collection component 214 is generally responsible for accessing or receiving (and in some cases also identifying) user data from one or more data sources, such as data sources 104*a* and 104*b* through 104*n* of FIG. 1. In some embodiments, user-data collection component 214 may be employed to facilitate the accumulation of user data of one or more users (including crowd-sourced data) for venue monitor 280 and notification engine 260. The data may be received (or accessed), and optionally accumulated, reformatted, and/or combined, by user-data collection component 214 and stored in one or more data stores such as storage 225, where it may be available to venue monitor 280 and notification engine 260. For example, the user data may be stored in or associated with a user profile 240, as described herein. In some embodiments, any personally identifying data (i.e., user data that specifically identifies particular users) is either not uploaded from the one or more data sources with user data, is not permanently stored, and/or is not made available to venue monitor 280 and/or notification engine 260.

User data may be received from a variety of sources where the data may be available in a variety of formats. For example, in some embodiments, user data received via user-data collection component 214 may be determined via one or more sensors, which may be on or associated with one or more user devices (such as user device 102*a*), servers (such as server 106), and/or other computing devices. As used herein, a sensor may include a function, routine, component, or combination thereof for sensing, detecting, or otherwise obtaining information such as user data from a data source 104*a*, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with communication events; etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein. In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 214 receives or accesses data continuously, periodically, or as needed.

Venue monitor 280 is generally responsible for monitoring user data for venue information or for information that may be used to identify venues of relevance to the user, determining information sources corresponding to the relevant venues, and determining user-relevant venue-information items for providing to the user. Venue monitor 280 may also determine contextual information and urgency associated with particular information items. As described previously, venues of interest to a user may be determined by monitoring user data received from user-data collection component 214. In some embodiments, the user data and/or information about the user determined from the user data is stored in a user profile, such as user profile 240.

At a high level, embodiments of venue monitor 280 may determine, from the user data, a set of venues, and user-related activity, patterns, or interactions associated with the venues, or other user venue-related data, which may be stored as user-relevant venue data 242 of user profile 240. Information sources for the venues may be identified and information provided by these sources may be analyzed for relevance to the user and/or urgency. In some embodiments, venue monitor 280 comprises an inference engine (such as a rule based or machine-learning-based inference engine) that is utilized to identify and monitor relevant venues and determine information from sources associated with those venues. The inference engine may utilize interpretive data to associate user data with one or more venues, as well as to identify user-relevant news items from information sources associated with the venues. In some embodiments, venues may be identified and monitored using one or more venue variables. Venue variables comprise data fields that may be populated with data determined from user data provided by user-data collection component 214 or generated by venue monitor 280.

In one embodiment, user data within certain a time frame (such as 90 days, 6 months, or 2 years) is monitored and used for determining entities of interest to the user, in order to account for changes in user interest. Likewise, in one embodiment, where user data indicates that a user has no interaction with a particular venue for a time frame, such as 1 year, it may be determined that the user is no longer interested in the venue. In some embodiments, venue monitor 280 monitors user data associated with the venues and other related information across multiple computing devices or in the cloud.

As shown in example system 200, venue monitor 280 comprises a venue identifier 281, information source identifier 282, venue information extractor 284, contextual information extractor 286, relevance analyzer 288, and urgency analyzer 289. In some embodiments, venue monitor 280 and/or one or more of its subcomponents may determine interpretive data from received user data. Interpretive data corresponds to data utilized by the subcomponents of venue monitor 280 to interpret user data. For example, interpretive data can be used to provide context to user data, which can support determinations or inferences made by the subcomponents. Moreover, it is contemplated that embodiments of venue monitor 280 and its subcomponents may use user data and/or user data in combination with interpretive data for carrying out the objectives of the subcomponents described herein.

Venue identifier 281, in general, is responsible for determining venues of interest to a user. In some embodiments, venue identifier 281 identifies a set of venues by monitoring user data for venue-related information. Venues may be inferred using an inference engine and analyzed for relevance to a user (such using relevance analyzer 288, described herein) based on, for example, the association of user data with the venue-related data. By way of example, venues may be inferred by analyzing user data (including interpretive data) for venue-related information, such as user location activity indicating patterns of visiting geographic locations corresponding to venue locations or online activity such as websites or social media pages visited by a user, communications associated with venues (such as emails received from a business or school), purchase history, or combinations of these. In some cases, venues may be identified using a knowledge base (such as a semantic knowledge base) of venues or entities associated with data features observed in user data, such as venues associated with geographic locations, domains of websites or emails, phone numbers, etc. In some embodiments, similar methods may be utilized by search engines to identify entities that may be relevant to a user based on user search queries and/or user search history.

In some embodiments, venue variables may be tracked (such as monitored and/or stored) by venue identifier 281 with respect to a corresponding detected instance of a venue. In particular, values corresponding to tracked venue variables may be stored in association with a user, for example, with respect to a corresponding one of user profiles 240, in venue data 242. Tracked variables can correspond to any of a variety of user data, examples of which have been described above and include sensor data or readings, which may be sensed by one or more sensors (such as information associated with a user device regarding location, position, motion/orientation, user-access/touch, connecting/disconnecting a charger, user activity on the user device, or other information that may be sensed by one or more sensors, such as sensors found on a mobile device), GPS coordinate samples, and many more. It will be appreciated that values of tracked variables may be associated with one or more venues and/or user activity and need not be venue specific. An example of a tracked variable is a time stamp corresponding to a respective instance of a user interaction with a venue. The time stamp can indicate the relative order or sequence of an interaction with a venue with respect to other interactions, and optionally instances of one or more other venue interactions of a corresponding routine or pattern, as further described below.

As a further example, interaction with a venue may comprise data indicating a user visiting a store. One tracked variable may correspond to an arrival location, such as an arrival location name. In detecting the venue, venue identifier 281 may infer the arrival as being satisfied based on user data comprising GPS data on the user's phone (e.g., user device 102*a* of FIG. 1), wherein the arrival location name is identified as a store and stored based on interpretive data that includes map data used to associate coordinates from the user's phone with a corresponding location name. Thus, for one instance, the arrival location name may be "Walmart," and for another instance, the arrival location name may be "Target," as examples. However, it will be appreciated that the level of granularity in the detection and tracking of potential user interactions with venues can vary. Thus, as an example, an arrival location name need not be a tracked variable. Furthermore, other examples of potential tracked variables, or more generally venue variables, include arrival time (e.g., a time stamp), arrival location coordinates, visit duration, routes or sequences of locations, and many more.

Venue identifier 281 may search and/or analyze user data for any of a variety of venue-related data including venue variables. By matching user data to one or more venues and/or venue variables thereof, venue identifier 281 may detect venues and identify relevant venues from patterns of detected venue interaction for users; for example, venue interactions indicating a pattern, such as the user visiting a grocery store every Wednesday night. Although several examples of how venue identifier 281 may make such determinations are described herein, many variations of venue identification and venue-variable monitoring are possible in various embodiments of the invention.

In one embodiment, in determining whether user interaction with a venue indicates relevance of the venue to the user, venue identifier 281 and/or relevance analyzer 288 can determine a confidence score of the venue relevance, and/or respective confidence scores of the one or more patterns of user interaction with the venue. Where a confidence score of a venue interaction or pattern of venue interactions satisfies a threshold value, venue identifier 281 may determine that the corresponding venue is relevant to the user.

A confidence score may correspond to a relative strength of a corresponding modeled pattern appearing in distributions of one or more values of tracked variables of detected venues. The confidence score may be impacted by various factors, such as the variance in the patterns, the age of detected venue interactions forming the patterns, and the number of detected venues forming the patterns. In some cases, where all confidence scores of venue interactions assigned to a venue pattern satisfy their respective threshold values, venue identifier 281 may determine that the venue is relevant to the user. It should be noted that any combination of the aforementioned threshold values may be the same or different with respect to one another.

In some embodiments, confidence scores of relevant venues may be determined by utilizing one or more confidence metrics. In some implementations, confidence metrics increase confidence scores based on detected repetitions or iterations of venue-related interactions over time as indicated in patterns formed by the detected venues. Confidence scores may be discounted based on lapsed time with respect to one or more of the repetitions or iterations. For example, a confidence score that may have been high in the past may be low in the present based on corresponding user behavior or behaviors having occurred far in the past. As another example, iterations may be phased out from consideration and/or storage over time. In this way, venue identifier 281 can adapt to changing lifestyles in which users may alter their interests and behaviors over time, and thus no longer be interested in certain venues.

As indicated above, venue identifier 281 (or venue monitor 280, including other components of venue monitor 280) can store any of the various data employed in tracking venue-related interactions of users as venue data 242. In some cases, venue data optionally includes entries that identify venues relevant to the user and/or venue user-interaction patterns. The entries may also store or otherwise indicate any of the various user data associated with a venue, such as user venue interactions and/or values associated with tracked variables of those interactions. Venue data 242 may also comprise confidence scores that correspond to the venues, such as confidence scores indicating relevance of a venue to a user. As indicated above, over time, venue identifier 281 may update venue data 242 as user data is periodically analyzed and confidence scores are determined and/or updated.

As further indicated above, patterns of detected user interactions with venues may be used to identify those venues of interest to a user (i.e., relevant venues) and determine details regarding the relevance, such as when, how, or in what aspects a user interacts with the venue. For example, a user may visit a particular grocery store on Wednesday evenings or a specific gas station whenever the user needs fuel. The venue pattern information is also used for determining relevant information, from information sources associated with the relevant venues, to provide the user. Thus, from the previous example, information indicating that the grocery store will be closed next Wednesday would be relevant to the user. Similarly, information indicating that the gas station is closed for refueling might be relevant to the user, if the user's vehicle gas tank is near empty (e.g., has ¼ tank of gas or less, for example).

Example approaches are described below, where each instance of a venue interaction has corresponding historical values of tracked variables that form patterns, and venue identifier 281 may evaluate the distribution of the tracked variables for patterns. In the following example, a tracked variable for a venue interaction is a time stamp corresponding to an instance of the interaction. However, it will be appreciated that, conceptually, the following can be applied to different types of historical values.

A bag of time stamps (i.e., values of a given tracked variable) can be denoted as $\{t_m\}_{m=1}^M$, and mapped to a two-dimensional histogram of hours and days of the week. The two-dimensional histogram can comprise a summation over the instances of the venue interaction, such as:

$$h_{ij} = \Sum_{m=1}^M I[\text{dayOfWeek}[t_m]=i] \wedge I[\text{hourOfDay}[t_m]=j].$$

This histogram can be used to determine derivative histograms. For example, a day of the week histogram may correspond to: $h_j = \Sum_i h_{ij}$. An hour of the day histogram may correspond to: $h_i = \Sum_j h_{ij}$. As further examples, one or more histograms may be determined for particular semantic time resolutions in the form of: $h_{i,C} = \Sum_{j \in C} h_{ij}$. Any of various semantic time resolutions may be employed, such as weekdays and weekends, or morning, afternoon, and night. An example of the latter is where C∈{morning, afternoon, night}, morning={9, 10, 11}, afternoon={12, 13, 14, 15, 16}, and night={21, 22, 23, 24}.

An additional data structure utilized in representing an event can comprise the number of distinct time stamps in every calendar week that has at least one time stamp therein, which may be represented as:

$$w_i^j = \|\{m | t_m \text{ is within the } i\text{-th } j \text{ week period}\}\|.$$

As an example, $w_2^3$ can denote the number of distinct time stamps during the $2^{nd}$ three-week period of available time stamps. $N^{(j)}$ may be utilized to denote the number of j-week time stamps available in the tracked data; for example, $N^{(3)}$ denotes the number of three-week periods available in the time stamps.

Venue identifier 281 (or venue monitor 280) may generate a confidence score that quantifies a level of certainty that a particular pattern is formed by the historical values in the tracked variable. In the following example, the above principles are applied utilizing Bayesian statistics. In some implementations, a confidence score can be generated for a corresponding tracked variable that is indexed by a temporal interval of varying resolution. For time stamps, examples include Tuesday at 9 am, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\Sum_i^K (\alpha_0 + h_i)};$$

where K denotes the number of bins, $\alpha_0$ is a parameter encoding the strength of prior knowledge, and $i^* = \arg\max_i x_i$. Then, the pattern prediction is the bin of the histogram corresponding to $i^*$ and its confidence is given by $x_{i^*}$. As an example, consider a histogram in which morning=3, afternoon=4, and evening=3. Using $\alpha_0=10$, the pattern prediction is afternoon, and the confidence score is $$\frac{10+4}{(10+3)+(10+4)+(10+3)} = \frac{14}{40} \approx 0.35.$$

In accordance with various implementations, more observations result in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of time stamps. Examples include 1 visit per week, and 3 visits every 2 weeks. Using a Gaussian posterior, a confidence score may be generated for a pattern for every period resolution, denoted as j. This may be accomplished by employing the formula:

$$\widehat{\mu^{(j)}} = \lambda\left(\frac{1}{N^{(j)}}\sum_i^{N^{(j)}} w_i^{(j)}\right) + (1-\lambda)\mu_0,$$

where $\lambda = \dfrac{\sigma_0^2}{\dfrac{\sigma^2}{N^{(j)}}+\sigma_0^2}.$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$conf_j = P(|x - \widehat{\mu^{(j)}}| < a) = \int_{\widehat{\mu^{(j)}}-a}^{\widehat{\mu^{(j)}}+a} \mathcal{N}(x | \widehat{\mu^{(j)}}, \widehat{\sigma}^{(j)}),$$

where $\widehat{\sigma}^{(j)} = \dfrac{1}{\dfrac{N^{(j)}}{\sigma^2}+\dfrac{1}{\sigma_0^2}}.$ As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $conf_1=0.25$. Furthermore, $\mu^{(2)}=10.31$ and $conf_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., satisfies a threshold value), venue identifier 281 may identify that a series of venue interactions corresponds to a venue pattern for the user. As a further example, venue identifier 281 may determine that a venue interaction of a pattern is being practiced by a user where one or more of the confidence scores for one or more tracked variables satisfy a threshold value. In this regard, an interaction of a pattern of venue interactions may be determined as being practiced based on venue identifier 281 identifying one or more patterns in historical values of one or more tracked variables of the venue.

In tracking venue interactions patterns with respect to users, venue monitor 280 may employ place prediction, which may be implemented using the histogram model indexed using the temporal interval, as described above. For example, in an embodiment, using the current time, the histogram model may be applied to each of the known venue places. Each place of these places can yield a probability that estimates a portion of visits to the venue at the current time:

$$P(\text{Place} = p \mid \text{time} = t) = \frac{P(\text{time} = t \mid \text{Place} = p)P(\text{Place} = p)}{\sum_{p'} P(\text{time} = t \mid \text{Place} = p')P(\text{Place} = p')}.$$

Quantity P(time=t|Place=p) is the histogram model described above. P(Place=p) is the prior probability of being in venue place p. The resolution of time t is relaxed in from narrow to broad (e.g., Tuesday at 9 am=>Weekday Morning) until the above quantity surpasses a threshold, in which case our model predicts venue place p.

Further, in tracking venue patterns with respect to users, venue monitor 280 may employ next venue place prediction, which may be implemented using the histogram model indexed by a period and a number of time stamps (i.e., samples), as described above. Using this model, the expectation for a visit in a particular week using the previous number of visits can be computed using the formula:

$$P(\text{time} = t \mid \text{Place} = p, \text{Week} = w) = \begin{cases} P(\text{time}=t\mid\text{Place}=p)\left(\dfrac{\#\text{of visits for week } w-\text{Expected Number Of Visits for week } w}\right) > 0 \\ 0 \quad \text{otherwise} \end{cases}.$$

The expected number of visits per week is computed using the period with the highest confidence.

In some embodiments, patterns of venue user interactions (i.e., venue patterns) may be determined by monitoring one or more variables related to venues and/or user data associated with those venues. These monitored variables may be determined from the user data described previously as tracked variables or as described in connection to user-data collection component 214. In particular, the variables may be determined from contextual data related to venues and/or user data from other users, such as other users interested in the same venues, which may be extracted from the user data by contextual information extractor 286, as described herein. Thus, the variables can represent context similarities among multiple venue interactions. In this way, patterns may be identified by detecting variables in common over multiple venue interactions. More specifically, variables associated with a first venue interaction may be correlated with variables of a second venue interaction to determine a likely pattern. For example, where a first interaction comprises a user visiting a grocery store on Wednesday evening, and a second interaction comprises a user visiting the same grocery store on the next Wednesday evening (or subsequent interactions indicate that the user visits the store for five out of six Wednesday evenings in a row), then a pattern may be determined that the user visits this venue on Wednesday evening.

In this example, the in-common variables for the two venue interactions include the same venue place (the grocery store), the same day of the week (Wednesday), and the same time (evening). Suppose further that an additional variable indicated that the user always or usually purchases milk, then this would be another in-common variable. (So in this example, suppose the grocery store ran out of milk on Wednesday afternoon and that a second user who also frequents the grocery store (i.e., another user with the same interest in the venue) posted via Twitter that she was upset because the particular grocery store was out of milk. In some embodiments, the second user's tweet comprises a venue information source, and since the information is relevant to the first user, the first user may be provided a notification that the grocery store is out of milk.) An identified venue pattern becomes stronger (i.e., more likely or more predictable) the more often the venue interaction instances that make up the pattern are repeated. Similarly, specific variables can become more strongly associated with a venue pattern as they are repeated.

Accordingly, venue identifier 281 provides a set of one or more venues having an association with the user, which may be stored in venue data 242. Information source identifier 282, in general, is responsible for determining sources of information for the venues identified by venue identifier 281. In particular, a set of one or more information sources may be determined for each venue determined to be relevant to the user. The set of information sources may be explicitly provided by the user and/or inferred, as further described below. The information sources associated with each venue may be stored in information source associations component 243. Examples of information sources for a particular venue can include, by way of example and not limitation, websites; message boards; bulletins; television or radio broadcasts; news; government websites, announcements, or publications; users' communications or accounts such as email (including email threads or chains including information related to a venue), SMS text messaging, RSS, and/or users calendar(s); social media (including the user's social media pages or news streams, a particular user's friends or social network, venue-related pages, blogs, or news feeds, or the pages/feeds of other users also interested in the same particular venue); or nearly any source of information about a particular venue or related to the venue in a manner relevant to the user. (For example, an information source about traffic conditions on a road in which the user drives to get to a venue might be considered an information source for that venue.)

Some embodiments of information source identifier 282 determine information sources through user data associated with a population of users who are interested in the same particular venue. For example, in one embodiment, where one user in the population has explicitly provided an information source for a venue, that source may be identified by information source identifier 282 and used for obtaining information to be potentially provided to other users in the population, if the information is relevant to those other users. To be more specific, the other users of this example will only receive the information if it is determined to be relevant to them.

As another example, a population of users comprises parents with children in the same class at a particular school. So here the venue is the school. An embodiment of the invention may crawl an email exchange between two of the users and determine the email contains information relevant to other users; for example, information about a special class event or an incident that happened that day at school. In this way, the email exchange is an identified venue information source for the school venue. The information in the email, which may be abstracted or de-identified to preserve privacy, may be provided to other parents if it is determined to be relevant to them, such as by relevance analyzer 288, as described below. In some embodiments, the parent user who provided the information in the email may be credited with providing the information.

As described above, the set of information sources may be explicitly provided by the user and/or inferred. In some embodiments, venue information sources may be inferred from semantic knowledge about the venue, from user activity of one or more users (such as online activity including websites visited by users in a population of users interested in the same venue). Venue information sources may also be determined from rules (including inferred or explicitly defined rules) and relationships associating information sources to venues, including for example search engine results from a query on the particular venue.

Venue source information may also be explicitly provided by a user, such as in response to a prompt asking the user to provide an information source for a venue of interest to the user, or confirming that a particular information source should be associated with a venue of interest to the user. Further, in some embodiments, a training session is utilized to determine at least some venues of interest to the user or at least some information sources for a venue. It is also contemplated that some venue sources may be persistently associated with a venue (such as an official website), while others may only provide occasional information about the venue (such as a general news website that occasionally has a news story about a particular venue).

Some embodiments of information source identifier 282 use venue-source logic 230, which may be stored in storage 225, to determine information sources associated with a particular venue. Venue-source logic 230 may include rules, conditions, associations, and/or ordered processes for identifying information sources. Moreover, a rule might specify searching for an official website for the venue, then looking at email communications where the email domain corresponds to the entity, and then social media posts, blogs, or news feeds where the entity is mentioned, for example. In some embodiments, venue-source logic 230 first determines an entity type associated with a particular venue, and then determines information sources based on rules (which may be explicitly defined or inferred) for each of the entity types. For example, where the venue is George Washington Elementary School, the venue type might be school. Venue-source logic 230 may specify searching for an official website where the venue type is a school. The logic may also specify conditions for determining that the information source corresponds to the specific venue, such as rules or conditions for matching the location of the venue with address information provided via the official website. In this way, the webpages for other George Washington Elementary Schools (which may be in other states or locations) are not determined to be information sources for the particular school that is relevant to the user.

In some embodiments, venue information sources may be associated with a trust value or score. The trust score corresponds to the level of trust or reliability afforded to the information source, and may be used for reconciling information items from different information sources, such as when there is conflicting information. The trust score also may be used for determining a confidence score for particular information items, as described below. In some embodiments, the trust score for a particular information source may change over time and may be learned based on user feedback including explicitly provided feedback and inferred feedback; for example, how a user responds (or how users respond in the case of crowdsourcing from a population of users interested in the same venue) to information from that particular source. A trust value also may be determined based on other user data, such as user history where a user frequently accesses the information source; for example, a webpage. Further, in some embodiments, users may be prompted to provide feedback about presented information, which may be used for determining the trust score. For example, a user may be prompted to rate how important a particular information source is for a particular venue.

Continuing with FIG. 2A, venue information extractor 284, in general, is responsible for extracting information from the venue information sources so that it may be evaluated for relevance and providing to a user, if relevant. In particular, venue information extractor 284 determines candidate information items (or content items), which are provided to relevance analyzer 288 for determining relevance to a particular user. Venue information extractor 284 may be considered to crawl, scan, or listen to one or more venue information sources for information items that may be relevant to a user.

In some embodiments, semantic analysis is performed on information in the information sources. For example, in one embodiment, information sources are analyzed and features are identified and extracted from the information available on a particular source. Features may include keywords (e.g., "closed," "cancelled," "event," "important," "warning," etc.), dates and times, entities (venues or other entities associated with venues such as people, roads, days of the week, etc.), and relationships between features, for example. In some embodiments, the features are provided as inputs to machine learning processes, which determine a likely semantic understanding of the information from which the features were extracted.

In some cases, for an item of information extracted from a venue information source, contextual information about the item is also extracted and used for determining relevance, such as described in connection with contextual information extractor 286. Further, an extracted information item may have a set of one or more scores corresponding to the information item, which may be used for determining whether and how to present the information item to a user. For example, in some embodiments, information items may have a corresponding confidence score, which may indicate the accuracy or reliability of the particular information item. The confidence score may be based in part on the trust score of the information source, based on the number of different sources that are publishing (or otherwise making available) the same information or consistent information (and similarly, whether other sources are providing information that is inconsistent with the information item) and/or the frequency with which the information is published or made available. Each information item may also have a corresponding relevance score and/or urgency score, in some embodiments, as further described below.

In some embodiments, venue information extractor 284 performs conflation on determined information items from multiple venue information sources; for example, information items from two or more venue information sources may be merged, and duplicated or redundant information eliminated. In one embodiment, a new composite information item is determined from the conflation or two or more information items, each from a venue information source. In this way, a user ultimately may be provided with relevant information derived from multiple venue information sources, without having duplicated information or duplicative notifications.

Contextual information extractor 286, in general, is responsible for determining contextual information associated with the information items determined by venue information extractor 284, such as context features or variables associated with venues, related information, and user-related activity. Contextual information may be determined from the user data of one or more users provided by user-data collection component 214 in lieu of or in addition to the information extracted by a venue information source. For example, contextual information extractor 286 may receive user data, parse the data, in some instances, and identify and extract context features or variables. In some embodiments, variables are stored as a related set of contextual information associated with a venue or particular information item, or user activity within a time interval following presentation to the user of a relevant information item (which may be indicative of a user response).

Some embodiments of contextual information extractor 286 determine contextual information related to a venue information item, entities identified in an information item or related to the information item (such as recipients of a group email), user activity associated with the venue, and current user activity. By way of example and not limitation, this may include context features such as location data; time, day, and/or date; number and/or frequency of the information on venue information sources; keywords in the information item (which may be used for determining relevance or urgency); contextual information about the venue (such as the entity type or venue type (e.g., a school, grocery store, bank, online community, etc.)); location or address of the venue; history information including frequency or level of contact the user has with the venue; type of interactions the user has with the venue; what user activity the user engages in relation to the venue, as well as when, where, and how long the user engages in activity associated with the venue; or any other variables determinable from the user data, including user data from other users.

In some embodiments, contextual information provided by contextual information extractor 286 may be used for determining relevance and urgency of information items. The contextual information also may be used by notification engine 260 for determining supplemental content for assisting the user in addressing the information item, and/or logic for presenting a notification to a user, such as when, where, or how to present notification content.

Relevance analyzer 288 is generally responsible for determining relevance to the user of a venue and/or an information item extracted from a venue information source. In particular, some embodiments of relevance analyzer 288 analyze user data to determine whether venues identified by venue identifier 281 are relevant to a particular user. The user data may include user data provided by user-data collection component 214 and/or other information about a user, which may be available via user profile 240 (such as user semantic knowledge 246, user accounts and activity data 248, and user preferences 244). Some embodiments may further determine a degree of relevance of a venue for the user, which may be reflected as a venue relevance score associated with the venue, and which may be stored in venue data 242. For example, a degree of relevance may be inferred based on the amount, frequency, or patterns of user interactions with the venue, or may be explicitly provided by the user (such as via a prompt, training session, or the user specifying interest in a venue, as described elsewhere herein).

Embodiments of relevance analyzer 288 may also analyze information items or features of the information from venue information extractor 284 for determining relevance of specific information to a user. Further, some embodiments also use contextual information from contextual information extractor 286 to determine relevance of the information to the user. Embodiments of relevance analyzer 288 may determine relevance based on user data (including interpretive data) from user-data collection component 214 (including information from other users) and information from user profile 240. For example, relevance of a specific information item may be determined by comparing features-information from the information item with information about the user, including for example user history (including user patterns), user preferences, semantic knowledge about the user, information provided by accounts associated with the user, such as calendar(s), email, or social media profiles, or other available user information. Similarly, as described previously, in one embodiment, the extracted features (such as keywords, dates and times, entities, and the relationships between features) may be integrated into a machine learning algorithm, such as further described below, for determining semantic understanding of the information. Relevance then may be determined by evaluating the semantic understanding with information about the user (such as user semantic knowledge). For example, where the user information indicates the user likely has a 10-year-old daughter and that she attends George Washington School, it may be inferred that the daughter is in the fourth grade. Information items from the school with features indicating the third grade class, or a particular teacher of the third grade class, may be determined as not relevant to the user. But information items having features associated with the fourth grade class (such as an announcement from a fourth grade teacher or a mention of other students in the fourth grade class, for example) may be determined as having relevance to the user.

In some embodiments, relevance may be determined at least in part by user feedback. For example, a user (such as a fictitious user named Dave) may be queried by a personal assistant application regarding relevance of venues or venue information, such as "Dave, I notice you go to this school every day. Do you want to receive notifications for this school?" or "Dave, it looks like you have a daughter in the fourth grade. Do you want to receive information updates about your daughter and her fourth grade class?" In some embodiments, relevance may be inferred; such as the example described previously where a user often visits a gas station for fuel, an information item from a particular information source indicates that the gas station is closed, and the user's fuel gauge indicates less than a quarter of a tank.

Some embodiments of relevance analyzer 288 may determine a relevance score or value for a venue and/or an information item from a venue information source. The relevance score may be used for determining whether a venue is sufficiently relevant to a user such that the user would likely desire to have notifications about the venue, or whether an information item is sufficiently relevant to the user to warrant providing the information to the user. In some of these embodiments, where the relevance score satisfies a threshold, the venue or information item may be determined as relevant to the user. The threshold may be predetermined, determined based on user data (including data from other users), or inferred. Further, in some embodiments, where multiple information items from different venues are relevant to a user, the relevance score (and in some cases an urgency score, described below) may be used to prioritize which information items should be provided to a user. For example, potential notifications to the user may be ranked based on relevance to the user (and/or urgency), as indicated by the relevance score. In this way, only the most relevant notifications are provided and the user is not overwhelmed with less relevant (or less urgent) notifications. Further, in some embodiments, the relevance score may be updated based on user feedback, which may be prompted. For example, at the bottom of a particular notification, the user may be presented a selection button such as "this item is not relevant to me." In some embodiments, relevance scores may also be updated based on the age of the user data used for determining relevance, such that relevance decreases or decays as time passes without new user data indicating further relevance. In this way, some embodiments of the invention adapt for users changing interests; users may not be provided information items from venues that are no longer of interest (relevance) to the user.

Urgency analyzer 289, in general, is responsible for determining an urgency level for an information item from venue information extractor 284. An urgency level can indicate when (including how often) the information item should be provided to the user and in some cases what format, such as a pop-up notification, alarm, start-of-day notification, or calendar item, for example. Moreover, an information item may become more urgent over time, such as when a deadline approaches, and the urgency level may be updated based on changes detected in contextual information, current user data, newly detected user patterns, or other information items (such as information items that are more urgent and/or relevant).

Urgency may be determined based on features of the information item and, in some embodiments, based on contextual information from contextual information extractor 286. In particular, in some embodiments, urgency analyzer 289 determines an urgency level, which may be embodied as an urgency score or numerical value, using features of an information item along with user data (received from user-data collection component 214) or contextual information (provided by contextual information extractor 286), or other data provided by venue monitor 280, user profile 240, or presentation component 218. For example, urgency analyzer 289 may consider similar information items previously provided to the user or provided to other users and user responses or activity following notification of the information. Urgency analyzer 289 may also or alternatively consider user data such as location information, time of day, and contextual information as well as user settings or preferences regarding the importance (or relevance) of certain venues. In some embodiments, an urgency score may be determined in part from contextual information based on context features associated with the information item (including extracted keywords or other context features extracted from similar information items from the same venue information source or other venue information sources). Additionally, some keywords may be predetermined to indicate possible urgency (such as "urgent," "immediate," or similar words that may be present in information items).

In some embodiments, a degree of urgency may be determined for an information item and used for determining a value representing the urgency score. For example, in an embodiment, the level of urgency for an information item may be determined relative to previous information items from a source or previous user responses (including other users) to the notification with the information, previously determined to be urgent or not urgent. In this way, the determined level of urgency may span a range (such as 1 to 10 or "Not Urgent" to "Extremely Urgent," for example) based on a comparison to similar information items and the extremes (urgent/important information and not urgent/important information) and how users responded to those notifications. Further, in some embodiments, one or more thresholds may be applied for determining whether the determined urgency score is sufficient enough to result in presenting a notification associated with the information item. For example, a user may desire not to be bothered by notifications corresponding to information items having low urgency or may desire only to be presented the most urgent items at certain times of the day, such as during meetings or at night while sleeping. Thus, the threshold values may vary based on the context and information item urgency score (or in some embodiments, the relevance score and/or confidence score). For example, if it is the middle of the night (determined from contextual information), the threshold for urgency to merit presenting a user with a notification may be higher than if it is in the middle of the day and the user is otherwise available. In some embodiments, using urgency score thresholds (or relevance score and/or confidence score thresholds), the thresholds may be determined based on predetermined rules, user history, data from other users, or user preferences or settings, such as further described below.

In some embodiments, an urgency score has an associated probability or confidence indicating a likelihood of the determined urgency. The confidence may be determined based on the amount of contextual information potentially indicating urgency and/or the magnitude (or weight) associated with specific features or pieces of venue source information or contextual information. In some embodiments, the confidence may be used for prioritizing notifications presented to a user. For example, where two or more notifications share a similar urgency and relevance, the one that has a higher confidence may take priority (e.g., may be shown first or sooner) over the others.

Continuing with system 200 of FIG. 2A, notification engine 260 comprises notification scheduler 264, supplemental content generator 266, and notification logic generator 268. At a high level, notification engine 260 is responsible for generating and providing notification content regarding venue information relevant to the user. The notification content may be provided to the user as a personalized notification (such as described in connection to presentation component 218), may be provided to an application or service of the user (such as a calendar or scheduling application), or may be provided as part of an API where it may be consumed by an application or service. In one embodiment, the notification content includes a notification, which may be in the form of the notification item provided by venue information extractor 284, or an information blurb or other information based on the information item, and may further include recommended action(s) for the user and/or supplemental content for assisting the user in addressing the information item.

In some cases, the notification content includes notification logic specifying conditions for presenting the notification (or otherwise providing the information to the user) based on user data, such as time(s), location(s), mode(s), or other parameters relating to presenting a notification from the notification content. For example, notification content may include a notification to the user that the school attended by the user's daughter is dismissing early on Friday for teacher meetings, with logic that specifies the notification may be presented to the user on Thursday evening and again on Friday morning. The notification logic may further specify that a notification should be presented to the user via the user's smart home computer interface (or the user's computer, for example) on Thursday evening and presented again on the user's smartphone in a pop-up window upon detecting that the user has accessed his phone for the first time on Friday morning. Additional logic may specify that an event "Pick up daughter from school early" should be added to the user's calendar on Friday afternoon. Continuing this example, the notification content may include supplemental content, such as information reminding the user that his wife has a meeting all day Friday and thus will be unavailable to pick up the daughter.

In some embodiments, notification engine 260 generates a notification to be presented to a user, which may be provided to presentation component 218. Alternatively, in other embodiments, notification engine 260 generates notification content and makes it available to presentation component 218, which determines when and how (i.e., what format) to present the notification based on notification logic in the notification content and user data applied to the notification logic. Further, in some embodiments, notification engine 260 generates notification content and makes it available to an API or to another application or service, where it can be consumed.

In some embodiments, a notifications service or application operating in conjunction with presentation component 218 determines or facilitates determining when and how to present the notification. Pending notifications associated with a user may be stored in a user profile 240, such as in a notification(s) component 250. Further, in some embodiments, notification engine 260, presentation component 218, and/or a notifications service or application manages pending notifications for a user and may prioritize which notifications are presented, such as described below.

As described previously, notification engine 260 may receive information from user-data collection component 214 and/or venue monitor 280 (which may be stored in a user profile 240 that is associated with the user), including relevant information items from venue monitor 280, which may have an associated relevance score, urgency score, and or confidence score; user data, user preferences, or other information from user profile 240; contextual information; or information from other components or sources that may be used for creating notification content.

Notification scheduler 264, in general, is responsible for determining the scheduling of presenting information items to a user. The determined schedule may be stored in association with a notification regarding the information item in user profile 240 (for example, in notifications component 250). In some embodiments, the scheduling information may be used to populate a user's calendar with the information item.

Notification scheduler 264 may determine a schedule for providing the information item to a user based on an urgency score, relevance score, user preferences, and/or user data. For example, as described previously in the example of a school dismissing early on Friday, a notification to the user may be scheduled for presentation to a user at an appropriate time so that the user is able to take action based on the information item in the notification (such as picking up his child from school earlier than normal). The schedule provided by notification scheduler 264 may comprise specific time(s) for providing the information item to the user, time frame(s) or window(s) for providing the information, and/or conditions to be satisfied for providing the information item (such as on Friday morning upon user data indicating that the user has accessed his phone for the first time, or upon user data indicating that the user's fuel gauge is less than a quarter of a tank). The schedule may be used for determining notification logic and other parameters associated with providing notification content to a user, such as where or when to provide notification(s); how or in what format(s) (e.g., as an alarm, pop-up, notification bug, spoken suggestion, etc.); with what look(s) or characteristics the notification content should be provided; and what should the notification content include (including how much content should be included and how much supplemental content should be included). In this way, a user may be provided with the information item at a time (or times, or time windows) determined likely to be opportune for the user to respond to the information item.

Some embodiments of notification scheduler 264 infer or predict a user's schedule for interaction(s) with a venue at a future time, based on user data and information provided by venue monitor 280. For example, it may be determined that a user goes grocery shopping at a particular store on Wednesday evenings. Thus, a notification that the store will be closed on Wednesday may be presented to the user on Tuesday afternoon so that the user can adjust her schedule and go to the store on Tuesday. Similarly, if on Wednesday afternoon traffic data indicates road closure due to construction for the road to the grocery store, a user may be presented with a notification prior to when the user would otherwise go to the store, and may be presented with alternative, nearby grocery stores (as supplemental information).

Notification scheduler 264 may also consider user data and other user information regarding the availability for receiving and/or responding to notifications. For example, a calendar or social network profile associated with the user may be evaluated to identify activity related to the user's availability at a future time to determine whether to schedule a notification (or otherwise provide the information item) at that time. User-availability information may be determined in part from contextual features associated with a user device, such as a device location, a device time, a mode of transportation, a device location check-in, an alarm, a charging state, a connectivity state, or user data stored on or accessible via the device. In a further example, user data evaluated for determining a notification schedule may comprise temporal information, locational information, and/or a wide variety of information that may be used to identify an activity (e.g., recurring) based upon the user signal (e.g., the device may have a location corresponding to a breakfast restaurant on Saturdays, which may indicate the user has a routine of eating breakfast at the breakfast restaurant on Saturdays).

As described above, user availability may be determined using calendar information from one or more user calendars, such as office calendars, personal calendars, social media calendars, or even calendars from family members or friends of the user, in some instances. Some embodiments of the invention may construct a complementary or shadow calendar for a user, for use in determining availability. In particular, in such embodiments, the complementary or shadow calendar maybe used for creating an availability model of the user.

It may be appreciated that, in some embodiments, a wide variety of information, such as temporal information and/or locational information, may be evaluated to identify sensor data and/or supplement sensor data (e.g., a user's primary calendar may be used to identify conflicts and/or verify activities derived from sensor data; sensor data may be evaluated against real-time data, such as traffic information, weather, or supplemental information, which may include information from the user's social media accounts, family or friends' social media accounts, email, news, and other user data (e.g., crowdsourced data)). In this way, the complementary calendar may be constructed with one or more entries derived from sensor data (e.g., automatically generated entries based upon inferred activities). In an embodiment, a complementary calendar may be merged with one or more calendars (e.g., the user's primary calendar, a family calendar, a social network calendar, etc.) to create a shadow calendar comprising at least some of the complementary calendar (e.g., automatically generated entries derived/inferred from sensor data) and at least some of the one or more calendars (e.g., user entries populated within the primary calendar by the user). User availability for scheduling notifications (or otherwise providing an information item) may then be determined based on the calendar information.

Supplemental content generator 266, in general, is responsible for determining supplemental content for assisting the user in addressing the information item. As described previously, notification content used to provide notifications to a user regarding relevant information may include supplemental content, in some embodiments. Supplemental content may include helpful information, such as relevant contextual information (e.g., in the example of a user being notified that his daughter's school is dismissing early on Friday, supplemental content might include that his wife is unavailable to pick up the daughter). Similarly, in the example where the user's regular grocery store is closed on the day the user usually does his shopping, supplemental information may include names of and directions to other, nearby grocery stores. Supplemental content may include information from other data sources (such as content from websites or links to content useful for the user, hints, tips, recommendations, or suggestions, which may be based on information derived from other users, and/or the actions or steps needed to be taken by the user in order to respond to the information item.

In some embodiments, the supplemental content may be determined based on a semantic understanding, using keyword and pattern analysis, of contextual information of the information item and user activity data from the user's previous responses to similar information items or other users' responses to similar information items. Further, in some embodiments, supplemental content may be determined in a manner similar to search engine results where features associated with the information item are queried and the results used for determining or providing supplemental content. Supplemental content may also be determined from rules based on the specific types of information items and/or the actions needed to address the information items, for example, rules for providing relevant links, phone numbers, alternative venues, operating hours, contextual background, or previous user activity undertaken that is determined likely to be relevant to the information item, or other rules for providing the content described herein with regards to supplemental content.

Notification logic generator 268, in general, is responsible for determining logic for presenting notification content to users, such as when or how to present the notification content, or otherwise providing information items to users. As described previously, notification content may include notification logic specifying conditions for presenting the notification (or otherwise providing the information to the user) based on user data, such as time(s), location(s), mode(s), or other parameters relating to presenting a notification from the notification content. Notification logic may specify rules, conditions, constraints, times (including future times or time windows), and/or other parameters for notifying the user of information from an information item, the content to be included in the notification, as well as logic specifying or recommending formats for presenting notification(s) or otherwise providing the information. In some embodiments, notification logic may be determined from user preferences or determined patterns, as described below, such as logic specifying not to present a notification in the middle of the night, unless the urgency score exceeds a user-specified threshold.

The notification logic may be generated based on the determined schedule, urgency, relevance, and/or confidence score associated with the information item, and/or other user data, such as current user information or contextual information. In one embodiment, notification logic is generated for each information item. In another embodiment, the same or similar notification logic is included in the notification content corresponding to information items of a certain category or class (such as information items corresponding to the same venue types). In one embodiment, notification logic includes priority information such that where more than one information items are pending, notifications can be prioritized based on relevance or urgency. In this way, notifications provided to the user can be managed (such as by presentation component 218 or another application or service) so that a user isn't overwhelmed by information. For example, in one embodiment, the relevance or urgency of information items may be used for ranking or otherwise prioritizing pending or potential notifications that correspond to those information items. Information indicating the determined priority or ranking may be included in the notification logic. Moreover, in an embodiment, based on the notification logic, pending or potential notifications may be ranked or scored relative to other pending or potential notifications based on the relevance or urgency of their corresponding information items. For example, in an embodiment, the score may comprise a weighted rank of each notification, which may be scored on the same scale and used for assigning a priority. In some embodiments, the pending or potential notifications may be logically organized in queue based on a weighted ranking or score. Further, upon changes occurring (such as new notifications or new relevant information items, dismissed notifications, new contextual information or other user data indicating changes in urgency or relevance), then the potential or pending notifications may be rescored, re-ranked, or otherwise reprioritized, in some embodiments. In some embodiments, notification logic is updated or otherwise generated to reflect the priority. Further still, in some embodiments, notification logic weighs urgency versus relevance scores, such that an information item having lower relevance that otherwise would not be presented to the user, is presented if the urgency score is high enough.

In some embodiments, notification logic may be determined based on user preferences or settings, which may be explicitly provided by a user or inferred from user patterns or settings provided by other users. For example, from the example described above, notification logic could specify not to present a notification between 6:00-7:00 pm because the user is very unlikely to respond during this time. In this way, some embodiments of the invention are adaptive and can learn from user responses or user settings. Similarly, a user could tune a notifications setting associated with a personal assistant application or service so that only the most relevant or urgent unaddressed events are brought to the user's attention during certain times (such as during meetings or in the middle of the night). For example, in one embodiment, a user can specify notification settings based on the category or type of venue corresponding to the information items, the level of urgency or relevance (such as by specifying a threshold, as described previously), user availability, or other contextual information.

Continuing with FIG. 2A, some embodiments of venue monitor 280 and notification engine 260 use statistics and machine learning techniques. In particular, such techniques may be used to determine pattern information associated with a user, such as venue patterns, user knowledge such as semantic understanding of the user, relevance of venues and information to the user, and urgency. For example, using crowdsourced data, embodiments of the invention can learn to associate keywords or other context and information item features with higher levels of relevance or urgency, based on determining how other users respond or react to information items with those features. In one embodiment, pattern recognition, fuzzy logic, neural network, finite state machine, support vector machine, clustering, or similar statistics and machine learning techniques are applied.

Example system 200 also includes a presentation component 218 that is generally responsible for presenting notifications and related content to a user or otherwise providing to the user information from an information item, based on the notification content determined by notification engine 260. Presentation component 218 may comprise one or more applications or services on a user device, across multiple user devices, or in the cloud. For example, in one embodiment, presentation component 218 manages the presentation of notification content to a user across multiple user devices associated with that user. Based on notification logic and user data, presentation component 218 may determine on which user device(s) a notification is presented, as well as the context of the presentation, including how (or in what format and how much content, which can be dependent on the user device or context) it is presented, when it is presented, and what supplemental content is presented with it. In particular, in some embodiments, presentation component 218 applies notification logic to sensed user data and contextual information in order to determine the presentation of notifications. Further, based on notification content provided by notification engine 260, presentation component 218 may present the information item of the notification content to the user or may present a summary or extraction of the information item, and may also present a link or expansion option for users to see the original information from the venue information source that led to the notification being presented, or other user data relied on to determine relevance or urgency of the information item. For example, a notification may include a button such as "see more details about this item," as shown in the example provided in connection to FIG. 3. In this way, a user can determine why he or she is being presented with a particular notification and thus provide feedback as to the relevance or urgency of the information.

In some embodiments, presentation component 218 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, presentation component 218 may query the user regarding the relevance, urgency, or user preferences regarding a venue or for handling an information item. Some embodiments of presentation component 218 capture user responses to notifications or user activity associated with notifications and provide this information to relevance analyzer 288.

As described previously, in some embodiments, a personal assistant service or application operating in conjunction with presentation component 218 determines when and how to present the notification. In such embodiments, the notification content may be understood as a recommendation to the presentation component 218 (and/or personal assistant service or application) for when and how to present the notification, which may be overridden by the personal assistant app or presentation component 218.

Further, some embodiments of presentation component 218 include functionality for managing pending notifications for a user and may prioritize which notifications are presented, based on urgency or relevance, user availability, user preferences, or other contextual information. Alternatively, in other embodiments, notification engine 260 or a notifications service or application manages pending notifications for a user and may prioritize which notifications are presented or how information is provided to the user.

Example system 200 also includes storage 225. Storage 225 generally stores information including data, computer instructions (e.g., software program instructions, routines, or services), logic, profiles, and/or models used in embodiments of the invention described herein. In an embodiment, storage 225 comprises a data store (or computer data memory). Further, although depicted as a single data store component, storage 225 may be embodied as one or more data stores or may be in the cloud.

Some embodiments of storage 225 store venue-source logic 230, as described previously. In one embodiment, storage 225 stores one or more user profiles 240, an example embodiment of which is illustratively provided in FIG. 2A. Example user profile 240 may include information associated with a particular user or, in some instances, a category of users, such as users having interest in the same venue(s). As shown, user profile 240 includes venue data 242 (which may include venue pattern data), venue information source associations 243, user preferences 244, user semantic knowledge 246 (or a user knowledge base), user account(s) and activity data 248, and notification(s) 250. The information stored in user profiles 240 may be available to the routines or other components of example system 200.

As described previously, venue data 242 generally includes information about venues relevant to the user determined by venue identifier 281 and associated user interactions with venues, such as patterns of venue interactions. Venue data 242 may also include venue trust scores associated with the venues, in one embodiment. Information source associations component 243 generally includes the set of one or more sources of information corresponding to the venues, as determined by information source identifier 282, and may include information sources inferred, learned from other users having interest in the same venue, and/or sources that are explicitly provided by the user. User preferences 244 generally include user settings regarding the importance (or relevance) of specific venues, specific information sources, thresholds, and/or notification preferences, as described herein. For example, user preferences 244 may store user feedback and settings indicating the level of acceptance for notifications or when and how much to be notified. In some embodiments, users can assign constraints or priorities to specific venues or information sources, time constraints for notifications, or notification preferences, for example.

User semantic knowledge 246 generally comprises a set of information inferred or otherwise determined about the user, and may be embodied as a knowledge base. User information determined from user data (including feedback and other user input) may be stored in user semantic knowledge 246, as described previously, and may be used for determining venue relevance or relevance of information items.

User account(s) and activity data 248 generally includes user data collected from user-data collection component 214 (which in some cases may include crowdsourced data that is relevant to the particular user), and may be used for determining semantic knowledge about the user. (In some embodiments, user account(s) and activity data 248 includes user semantic knowledge 246.) In particular, user account(s) and activity data 248 can include user data regarding user emails, texts, instant messages, calls, and other communications; social network accounts and data, such as news feeds; online activity; and calendars, appointments, or other user data that may be used for determining relevance, urgency, scheduling, contextual information, and/or supplemental information. Embodiments of user account(s) and activity data 248 and/or user semantic knowledge 246 may store information across one or more databases, knowledge graphs, or data structures.

Notification(s) 250 generally includes data about pending notifications associated with a user, which may include notification content corresponding to one or more information items. In some embodiments, notification(s) 250 includes a schedule associated with a notification, data corresponding to notifications that have not yet been presented to a user, or supplemental content that may not be provided to a user. (Further, in some embodiments, notification(s) 250 may also include information about previously pending notifications.)

Figure 3:
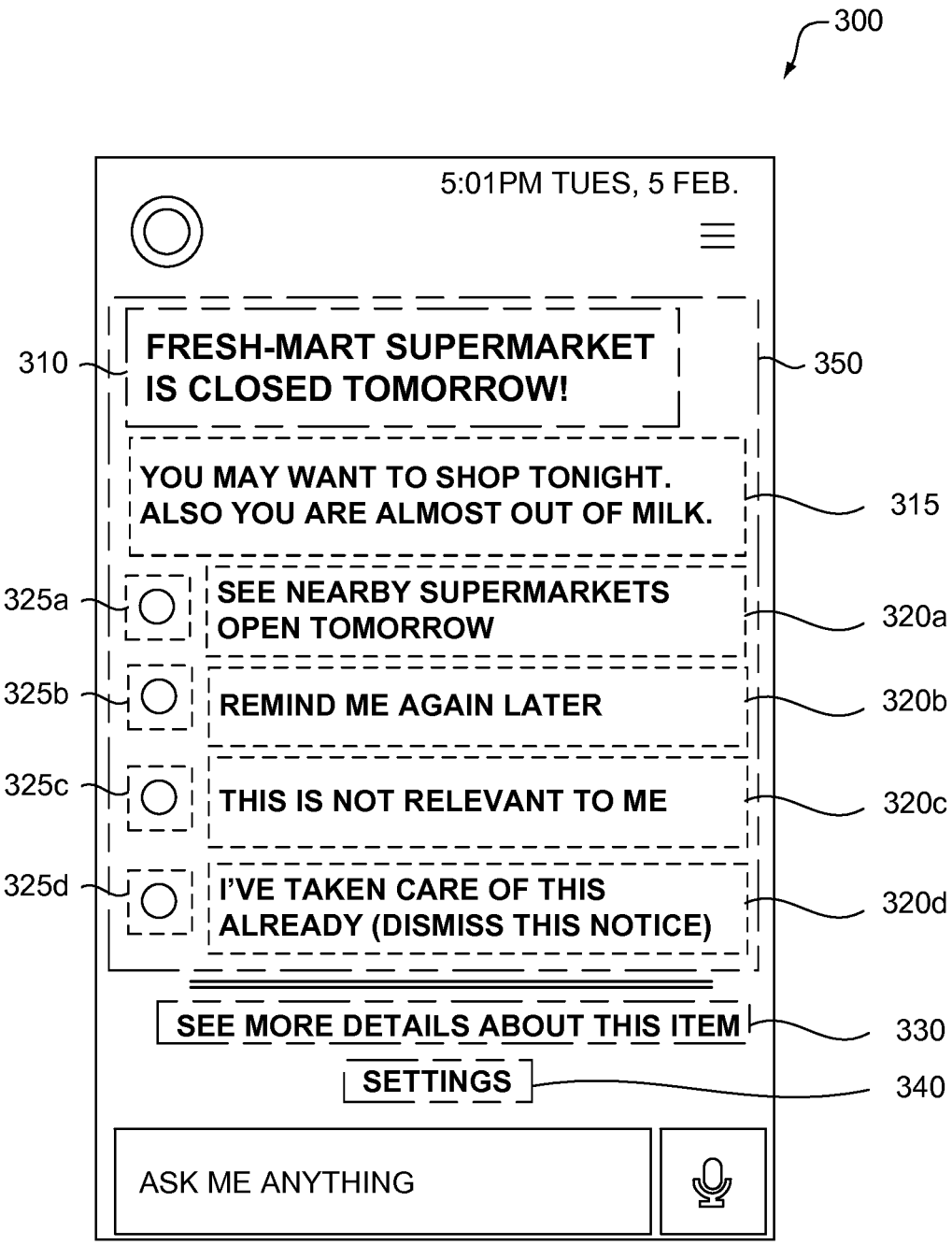
FIG. 3 depicts one example of notification content that may be presented to a user, in accordance with an embodiment of the invention.

Turning now to FIG. 3, an example of a notification generated based on an information item is described. In this example, the information is from a supermarket indicating that the supermarket is closed tomorrow (Wednesday). The information is relevant to the user because the user has a pattern of shopping at the supermarket for groceries on Wednesday evenings.

FIG. 3 depicts an example user interface of a user device (not shown) having a number of elements for providing content associated with the example notification, and is referenced generally as user interface 300. In this example, user interface 300 comprises a graphical user interface on a user device, such as a smartphone. Example user interface 300 depicts one example of a notification 350 presented to a user in accordance with an embodiment of the invention. The example notification 350 includes a notification message 310 informing the user that the user's grocery store will be closed tomorrow (Wednesday).

With continuing reference generally to FIG. 3, notification content may be determined by notification engine 260 and used by presentation component 218 for preparing the example notification 350. In one embodiment, the notification content generated by notification engine 260 may be formatted in a markup language, tagged, or indexed to indicate how specific portions of the content are to be used by presentation component 218. For example, in one embodiment, with regards to notification 350, notification content may include a tagged notification message 310, such as "<NOTICE> Fresh-Mart Supermarket is Closed Tomorrow!<NOTICE>." Other portions of notification content may be marked up or tagged in a similar fashion so as to indicate how the notification content data and/or notification logic should be applied.

In an embodiment, notification engine 260 may determine the following information, which may be used for generating notification content corresponding to example notification 350. Here, the determined information item is that the Fresh-Mart supermarket is closed tomorrow.

Contextual information may include, for example, that the user is almost out of milk; the location of the supermarket, which may be used for identifying nearby supermarkets; or when the user typically visits the supermarket.

The notification content generated by notification engine 260 may include a relevance and/or urgency score associated with the information item (such as high relevance and urgent (or a numeric value such as 8.1 on a scale of 1 to 10)). Here, a determined relevance score may remain constant, but an urgency score may increase (which may be specified by notification logic) based on proximity to Wednesday evening, when the user typically visits the venue (i.e., the supermarket). The notification content also includes scheduling information indicating that the notification should be provided to the user on the evening before the user typically visits the venue.

Continuing with the example of the closed supermarket, the notification content generated by notification engine 260 may also include supplemental content. Here, the supplemental content includes information about nearby supermarkets that are open on Wednesday evening, which may be determined by supplemental content generator 266 using contextual information.

Figure 2B:
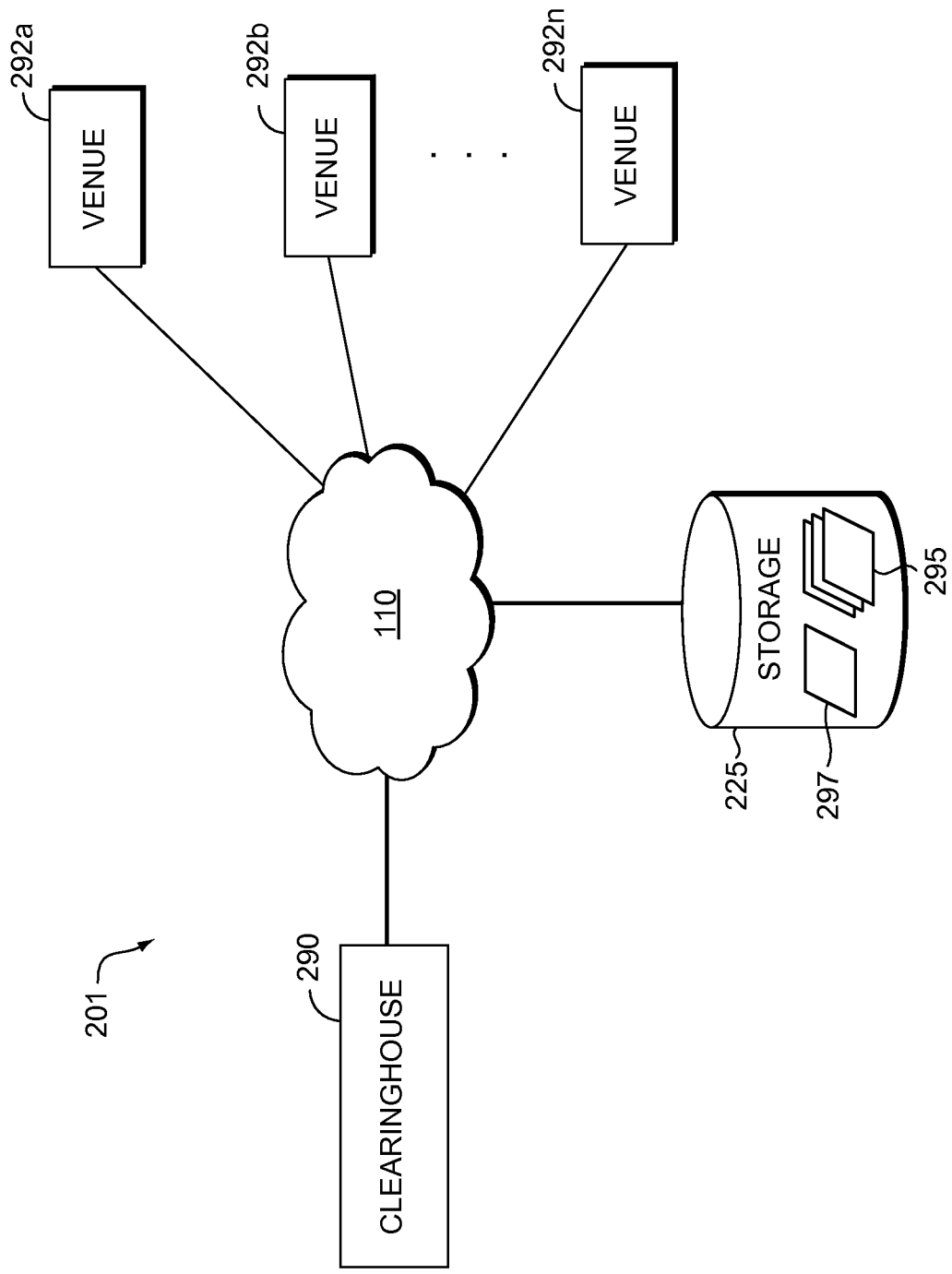
FIG. 2B is a diagram depicting another example computing architecture suitable for implementing aspects of the invention.

Turning now to FIG. 2B, with FIGS. 1 and 2A, another example computing system architecture is provided suitable for implementing an embodiment of the invention and designated generally as system 201. Embodiments of system 201 may include many of the same components as system 200, some of which are not shown for the sake of clarity. As shown in FIG. 2B, system 201 includes network 110 and storage 225, as described in FIG. 2A. System 201 further comprises venue-information source clearinghouse 290, venues 292a and 292b through 292n. Venues 292a and 292b through 292n each comprise a venue as previously described, and may be a physical place, such as a place of business, school, church, park, city, or other physical location, or may be virtual, such as an online community or group. Venue-information source clearinghouse 290 comprises a clearinghouse that may be used for receiving information from venues such as 292a and 292b through 292n. For example, as described previously, in one embodiment, a common API may be utilized such that venues may provide information to clearinghouse 290 as a service to their customers, members, or users. Clearinghouse 290 thus provides a repository of information from venues, which may be stored as venue information 295 in storage 225. In some embodiments, venue information 295 may be structured, tagged, labeled, or otherwise organized to facilitate interpretation. (For example, the information may include a field or tag for an expiration time indicating that the information is no longer relevant after that time.) Similar fields may include venue type (e.g., a school, business, public place, municipality, etc.), dates, times, and notification categories (such as changes to opening hours or times, special events, warnings, for example.) Some embodiments of system 201 further include clearinghouse account information 297, which may comprises accounts for venues 292a and 292b through 292n (which may be used by venues for facilitating access to clearinghouse 290) and/or user accounts for facilitating access to the venue information by users. For example, in one embodiment, venues subscribe to or sign-up for, and may even pay to provide their information to, venue clearinghouse 290. Similarly, users may subscribe or sign-up to receive information, relevant to the user, made available via clearinghouse 290.

Accordingly, embodiments of the venue-information source clearinghouse 290 may be utilized by components of system 200 including venue monitor 280 (and/or venue identifier 281, information source identifier 282, venue information extractor 284, and contextual information extractor 286) to identify venues, venue information sources, and in some cases, venue information and/or contextual information. In this way, venue monitor 280 (or relevance analyzer 288 and/or urgency analyzer 289) may analyze information available via clearinghouse 290 provided by user-relevant venues to determine relevant information items, and their urgency, which may be provided to notification engine 260. Additionally, applications and services, such as a user's personal assistant application, may access the clearinghouse, determine those venues and corresponding information items relevant to the user, extract the information, and consume it, such as via notification(s), automatically populating the user's calendar with the information, adding tasks, shopping list items, etc.

With reference to FIG. 3, using notification content including the information described previously, a presentation component (such as presentation component 218) or a personal assistant application or service may generate and provide one or more notices to a user, such as notification 350. User interface 300 includes notification 350, and may also include one or more other control options such as settings control item 340 or see-more-details-about-this-item 330. Settings control item 340 may provide the user with options to set preferences such as those described in connection to user preferences component 244.

Example notification 350 includes a notification message 310 informing the user that "Fresh-Mart Supermarket is Closed Tomorrow!" Notification 350 also includes a recommendation 315 ("You may want to shop tonight") with contextual information telling the user that she is almost out of milk. Notification 350 further includes response options 325a-325d and a corresponding description 320a-320d for each response option. The notification response options 325a-325d correspond to one or more tasks or user actions for responding to the information item. (In some embodiments and in some situations, notifications do not include response options and/or recommendations.) In this example, response option 325a provides the user with the option of seeing supermarkets that are open on Wednesday evening and are located near the Fresh-Mart supermarket, which may be determined by supplemental content generator 266 and user data. Another response option 325b provides the user with the option of being reminded about the information later. Under this option, notification logic may include a schedule indicating conditions or times (or time windows) for presenting a notification, which may be used for subsequently presenting the notification. Response option 325c provides feedback from the user that the information item is not relevant to the user. Response option 325d gives the user the option to dismiss the notification because the user has already addressed the information item. In some embodiments, where the user selects a particular option (in response to any notification), current user data and contextual information may be captured and used for determining relevance and urgency for future information items and/or relevance of the venue.

Notifications such as example notification 350 may include one or more control options such as settings control item 340 or see-more-details item 330. Settings control 340 enables the user to configure settings such as described previously; for example, settings associated with notifications, venues to be monitored, sensitivity or thresholds such as when to notify the user, preferred formats for notification, interest or relevance in venues, information sources, or other user preferences. In some embodiments, settings control item 340 enables a user to view and/or modify the default settings or learned settings. See-more-details item 330 provides feedback information to the user regarding the notification content generated in response to the information item, as described previously.

In some implementations, the specific notification content that is presented to a user may be determined using one or more content templates, or content cards. In particular, a content card can comprise one or more static content fields and/or one or more dynamic content fields. Static content fields correspond to content fields having corresponding content that is displayed each time the content card is presented. Dynamic content fields correspond to content fields having corresponding content that may vary between presentations of the content card. Thus, examples of static content fields might include static content fields 325*a*-325*d* in FIG. 3. Examples of dynamic content fields might include dynamic content fields 320*a*-320*d*.

Figure 4:
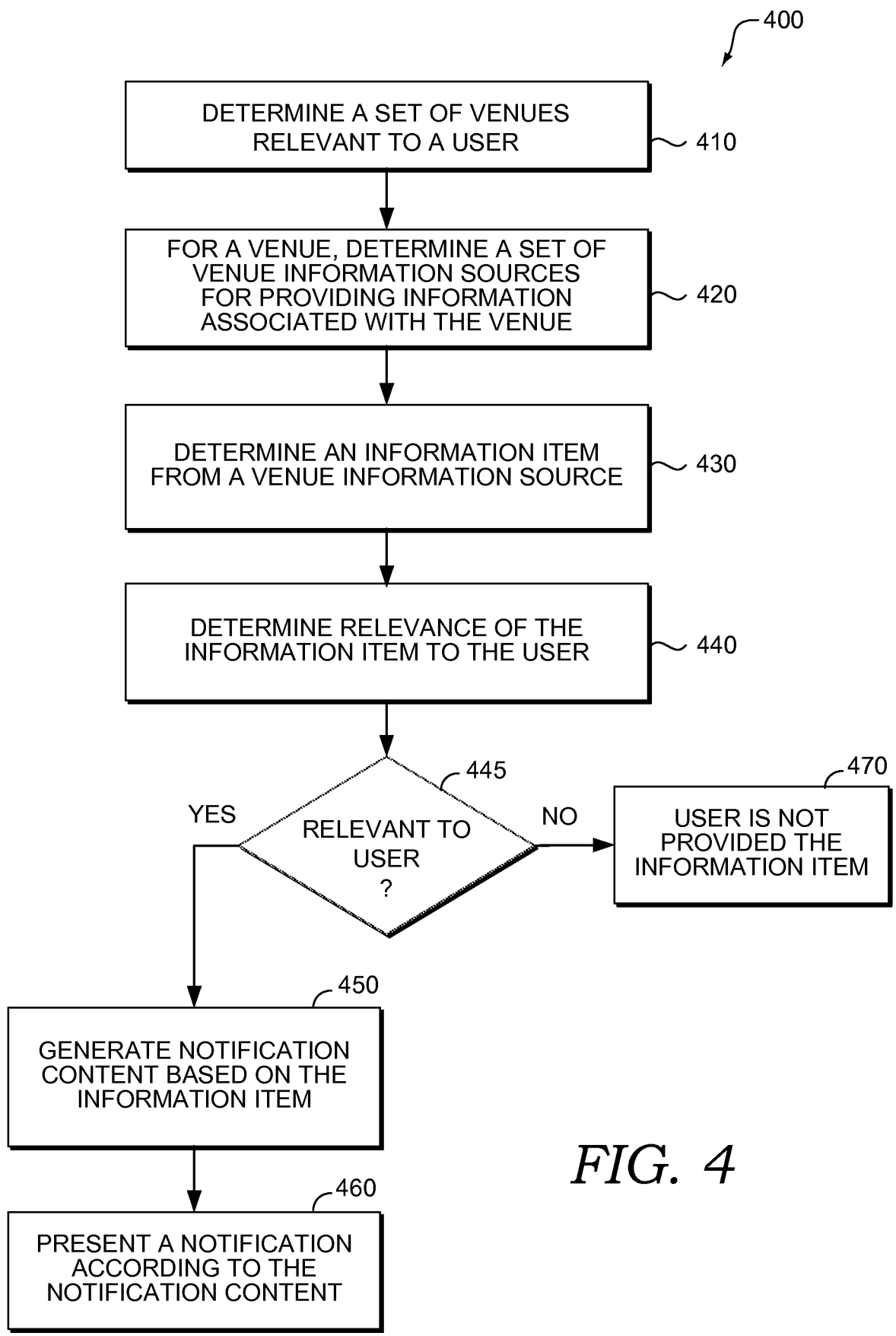
FIGS. 4-5 depict flow diagrams of methods for providing personalized information from venues that are of interest to a user, in accordance with an embodiment of the invention.

Turning now to FIG. 4, a flow diagram is provided illustrating one example method 400 for providing to a user personalized information from venues that are of interest to the user. Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 410, a set of venues relevant to a user are determined. As described herein, a venue may refer to nearly any entity for which a user may have a potential interest and desire to know of announcements, messages, or information updates. Embodiments of step 410 may determine one or more venues based on monitoring user data for venue related information. The set of relevant venues may be stored as venue data in a profile associated with the user.

In some embodiments, user data is monitored to determine a knowledge base about the user, which may comprise semantic knowledge, and may include information about user activity, patterns, or interactions with venues. From the knowledge base about the user, venues may be identified based on features including user-visited locations, entities recurring communications, online activity, etc., and may be inferred as relevant based on the level of association with the user, in one embodiment. In some embodiments, a venue identified in the user data may be determined to be relevant based on user data (including interpretive data), and/or user profile information, which may include patterns of user interactions with the venue or explicit user feedback regarding the venue relevance, for example, and, in some embodiments, may be determined using a relevance analyzer, such as described in connection to relevance analyzer 288 of FIG. 2A. Some embodiments of step 410 may be carried out by a venue identifier component, such as described in FIG. 2A.

Further details of determining a set of venues relevant to a user are described in connection with venue identifier component 281 in FIG. 2A.

At step 420, a set of one or more information sources are determined for providing information for a venue determined in step 410. In embodiments of step 420, a set of one or more information sources may be determined for each venue of the set of venues determined to be relevant to the user. As described herein, the set of venue information sources may be explicitly provided by the user and/or inferred. In some embodiments, venue information sources may be inferred from semantic knowledge about the venue, from user activity of one or more users (such as online activity including websites visited by users in a population of users interested in the same venue). Venue information sources may also be determined using venue source logic which includes rules (including inferred or explicitly defined rules), conditions, associations, and/or ordered processes for identifying information sources. The set of information sources determined in step 420 may be stored in a user profile associated with the user, and may be monitored for determining venue information that is relevant to the user. Some embodiments of step 420 may be carried out by an information source identifier component, such as described in FIG. 2A. Further details of determining a set of venues relevant to a user are described in connection with information source identifier 282 in FIG. 2A.

At step 430, an information item is determined from a venue information source identified in step 420. Embodiments of step 430 identify and extract information from a venue information source so that it may be evaluated for relevance to the user and provided to the user, if relevant. In some embodiments, candidate information items are determined and may be analyzed for relevance to the user, such as by using a relevance analyzer component. Further, in some embodiments, semantic analysis may be performed on information available from the venue information sources, such as by identifying, extracting, and analyzing features, as described herein, and used for determining relevance (as well as urgency).

Some embodiments of step 430 comprise conflating venue-related information items from multiple venue information sources determined in step 420. For example, in an embodiment, information items from two or more venue information sources, which may be determined in step 420, are merged, and duplicated or redundant information eliminated. In one embodiment, a new composite information item is determined from the conflation or two or more information items, each from a venue information source. In this way, a user ultimately may be provided with relevant information derived from multiple venue information sources, without having duplicated information or duplicative notifications. For example, suppose a first information item determined from a first venue information source includes partial information about the venue, and a second information item determined from a second venue information source includes partial information that is different than the first information item. In one embodiment, the first and second information items may be conflated into a new composite information item that includes information from both the first and second information items. Moreover, in some embodiments, this composite information item may be evaluated for relevance to the user (such as described in step 440), and in one embodiment, information that is determined relevant to the user may be preserved in the composite information item, but information that is determined to be irrelevant may be pruned, such as deleted, hidden from the user, or not shown unless the user requests to see additional information, for example by selecting a "show me more" link associated with a notification.

In some embodiments, step 430 further comprises determining contextual information related to the information item, such as context features or variables associated with venues, related information, and user-related activity, including user interactions with the venue. As described previously, contextual information may include information related to a venue information item, entities identified in an information item or related to the information item (such as recipients of a group email), user activity associated with the venue, and current user activity. Some contextual information may be determined from the user data of one or more users provided by user-data collection component 214 in lieu of or in addition to the information extracted by a venue information source. Additionally, in some embodiments, contextual information may be used for determining relevance and/or urgency of the information item determined in step 430. Contextual information also may be used for determining supplemental content for providing to the user to facilitate addressing the information item, and/or logic for presenting a notification to a user, such as when, where, or how to present notification content. Additional details of determining an information item in accordance with step 430 are described in connection with venue information extractor 284 in FIG. 2A.

At step 440, relevance of the information item provided in step 430 is determined. In particular, embodiments of step 440 determine relevance to the user of an information item extracted from a venue information source. In some embodiments, step 440 may determine relevance based on user data (including interpretive data) from user-data collection component 214 (including information from other users) and information from user profile 240. For example, relevance of a specific information item may be determined by comparing features-information from the information item with information about the user, including for example user history (including user patterns), user preferences, semantic knowledge about the user, information provided by accounts associated with the user, such as calendar(s), email, or social media profiles, or other available user information. In one embodiment, extracted features (such as keywords, dates and times, entities, and the relationships between features) may be integrated into a machine learning algorithm for determining semantic understanding of the information. Relevance then may be determined by evaluating the semantic understanding with information about the user (such as user semantic knowledge). In some embodiments, contextual information, which may include context features, may also be used for determining relevance.

Further, in some embodiments, information contained in an information item may be pruned based on relevance to the user. For example, an embodiment of step 440 may evaluate the information and determine that a portion of information in the information item is not relevant to the user. The irrelevant portion (or portion of less relevance) may be tagged or otherwise designated and/or may be pruned so that ultimately the user is shown the relevant information and not shown the irrelevant information.

For example, consider an information item comprises an announcement for from a website (venue information source) associated with a particular $5^{th}$ grade class of a school that the user's daughter attends, and her daughter is in this $5^{th}$ grade class. Suppose the website announcement states that boys' health screenings will take place Wednesday after school, girls' health screenings will take place Thursday after school, and all children need to bring signed parental consent forms for the health screenings. Because the user has a daughter in the $5^{th}$ grade (and not a son), step 440 may determine that the information relevant to the user comprises information about the signed parental consent form and information about girls' screening on Thursday. Thus, the user may be presented with a notification (steps 450 and 460) reminding the user that her daughter's health screening is afterschool on Thursday and that she needs to bring her signed parental consent form.

In some embodiments, relevance may be determined at least in part by user feedback, or relevance may be inferred or may comprise a relevance score. In particular, some embodiments of step 440 determine a relevance score associated with the information item indicating the degree of relevance (i.e., how relevant it is) to the user. The relevance score may be used for determining whether an information item should be provided to the user. For example, in some of these embodiments, where the relevance score of an information item satisfies a threshold, the information item may be determined sufficiently relevant (or irrelevant, depending on the threshold) to the user and provided (or not provided). Additional details for determining relevance to the user of an information item, including determining relevance scores, are provided in connection to relevance analyzer 288 in FIG. 2A.

Some embodiments of method 400 may further determine urgency associated with an information item. In particular, urgency may be determined based on features in the information item (such as date/time features, keywords such as "urgent," for example, or other features as described herein). Urgency may also be determined based on contextual information, and may further be determined as a value or score. In some embodiments, urgency may be used for scheduling presentation of the information item to the user, such as via a notification, and the formatting of the notification, as described previously. Additional details for determining urgency regarding an information item are provided in connection to urgency analyzer 289 in FIG. 2A.

At step 445, the information item relevance determined in step 440 is evaluated in order to determine whether information from the information item is to be provided to the user. Where the information item is determined to be not relevant to the user, then method 400 proceeds to step 470, and the user is not provided the information item. But where the information item is determined in step 445 to be relevant to the user, then method 400 proceeds to step 450.

In some embodiments of step 445, a relevance value or score is used to determine whether the information item is considered relevant to the user. For example, a relevance score may be compared to a threshold, such as described previously. In some embodiments, the threshold may be predefined, inferred or learned (including learned from other similar users or users interested in the same venue) as described previously, and/or based on user settings or preferences. For example, a user may only desire to receive information about a particular venue that is determined to be highly relevant to the user. In an embodiment of method 400, where the threshold is satisfied, the information item is determined to be relevant to the user and method 400 proceeds to step 450.

At step 450, notification content is generated based on the relevant information item. In some embodiments, the notification content also may be generated based on contextual information and/or urgency associated with the information item. The notification content may be used for generating and/or providing a notification to the user at an appropriate time, such as at a future time when the user will be able to respond to the present information item. In some embodiments, the notification content may specify one or more formats for notifications (i.e., how notification(s) may be provided to the user) and the timing of the notification presentation, which may be determined based in part on contextual information and/or urgency associated with the information item, and the user's schedule. Some embodiments of step 450 may be carried out by a notification engine component, such as described in FIG. 2A. Further details regarding generating notification content in step 450 are provided in connection to notification engine 260 in FIG. 2A and the example described in connection to FIG. 3.

In some embodiments, the notification content generated in step 450 includes notification logic. Notification logic may be generated based on the information item, the relevance determined in step 440, the urgency of the information item, contextual or supplemental information associated with the information item, user preferences or settings, and/or other user data, such as current user information, for example. Notification logic, as previously described, may specify rules, conditions, constraints, times (including future times or time windows), priority with regards to other notifications, and/or other parameters for notifying the user of the information item and the content to be included in notifications, as well as logic specifying or recommending formats for presenting the notification. Additional details regarding notification logic are provided in connection to notification logic generator 268 in FIG. 2A.

In some embodiments, the notification content may include supplemental content for assisting the user in addressing the information item. As described herein, supplemental content may include helpful information, such as relevant contextual information; information from other data sources; hints or tips, which may be based on information derived from other users' responses to similar information items; recommendations or suggestions; and/or the actions or steps needed to be taken by the user in order to address the information item. In some embodiments, supplemental content may be determined based on a semantic understanding, using keyword and pattern analysis, of contextual information of the information item. Additional details regarding supplemental content are provided in connection to supplemental content generator 266 in FIG. 2A.

At step 460, a notification is presented to a user according to the notification content generated in step 450. In embodiments of step 460, a notification about the information item, and in some cases related content, may be provided to a user, based on the notification content. Embodiments of step 460 may be carried out by a presentation component, such as presentation component 218 described in FIG. 2A. In some embodiments, step 460 comprises generating a notification based on information provided in the notification content, including information about the information item. Further, a notification may be generated based on notification logic provided in the notification content and may include supplemental content provided in the notification content, such as described in connection to FIG. 3. Some embodiments of step 460 comprise communicating notification content to one or more user devices wherein an application or service uses the notification content to generate and present the notification. In some embodiments, notification content may be generated in step 450 on a user device and presented in step 460 on the user device. Alternatively, in some embodiments, notification content determined in step 450 is provided to the user via one or more applications or services that consume information from notification content. For example, a calendar application may receive the notification content and provide the information item to the user as a populated calendar entry and reminder.

Some embodiments of step 460 also include generating user interface features associated with the notification. Such features can include interface elements (such as graphics, buttons, sliders, menus, audio prompts, alerts, alarms, vibrations, pop-up windows, notification-bar or status-bar items, in-app notifications, or other similar features for interfacing with a user), queries, or prompts. Additional details regarding presenting a notification in step 460 are provided in connection to presentation component 218 and notification engine 260 in FIG. 2A and the example described in connection to FIG. 3.

In some embodiments of step 460, notification content generated in step 450 may be provided to a service for presentation of the content to a user. In particular, a service running on a user device that receives the notification content generated in step 450 may present a notification. The presentation of the notification may be based on information in the notification content, such as notification logic, other user data, and characteristics of the particular user device.

For example, a cloud service may provide the aforementioned notification content to the service, which may be external to the cloud system comprising the cloud service. The service could be a third-party service and may be running on user device 102a (FIG. 1). More particularly, the service could be an application, such as a notification application, a scheduler or calendar application, a communication application, or another type of application, or app. The application may incorporate an API for communication with the cloud service. This may include requesting the data, and/or requesting one or more portions of the data. As an alternative to requesting, at least some of the data could be pushed to the application, for example, as unaddressed events are detected. The application may subscribe to receive these push messages. The API may further provide functions for interpreting the received data (e.g., the recommended actions and contextual information), and possibly for at least partially assisting the presentation of the notification content.

In some cases, the same cloud system and/or cloud service may be utilized to perform method 400 so as to provide notification content to multiple services, which may be running on many different user devices. As such, system 200 can save significant processing, bandwidth, storage, and computing resources by centralizing the venue monitoring functionality. For example, user-data collection component 214 (FIG. 2A) can accumulate user data and interpretive data for multiple users, such that each user device does not require separate and redundant data collection and storage. Additionally, the processing and storage of user profile data can be made more secure by being disassociated from the user device, which is closely tied to the user.

In one embodiment of method 400, where a venue-information source clearinghouse is utilized, such as described in connection to FIG. 2A, steps 410 through 440 may comprise accessing the information available via the clearinghouse.

Figure 5:
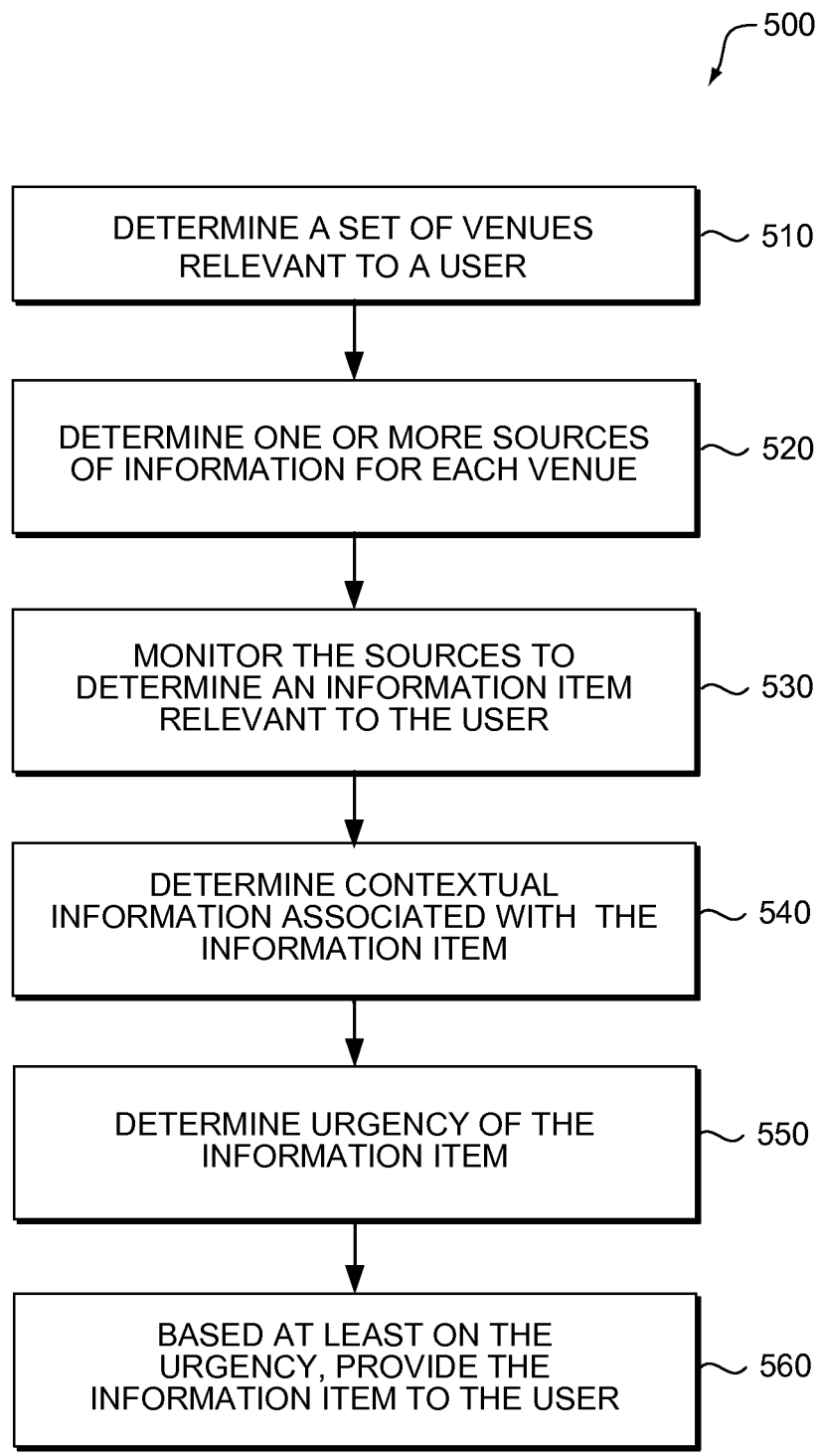

With reference now to FIG. 5, a flow diagram is provided illustrating one example method 500 for providing to a user personalized information from venues that are of interest to the user. At step 510, method 500 includes determining a set of venues relevant to a user. Embodiments of step 510 may be carried out as described in step 410 of method 400 (FIG. 4). At step 520, one or more sources of information are determined for each venue determined in step 510. In particular, a set of one or more information sources may be determined for each venue of the set of venues determined to be relevant to the user. Embodiments of step 520 may be carried out as described in step 420 of method 400 (FIG. 4).

At step 530, method 500 includes monitoring the sources to determine an information item relevant to the user. Embodiments of step 530 monitor the sources of information determined in step 520 for information relevant to the user. For example, information (or features extracted from the information) may be analyzed for relevance to the user, such as described in connection to relevance analyzer 288 or FIG. 2A, or step 440 of method 400. Upon identifying information relevant to the user, some embodiments of step 530 extract and provide the relevant information as an information item.

At step 540, contextual information associated with the information item is determined. Embodiments of step 540 may be carried out as described in step 430 of method 400 (FIG. 4) regarding determining contextual information related to the information item. In some embodiments of method 500, contextual information determined in step 540 may be used for determining urgency of the information item in step 550. Contextual information also may be used by for determining supplemental content for providing to the user to facilitate addressing the information item, and/or logic for presenting a notification to a user, such as when, where, or how to present notification content.

At step 550, urgency of the information item is determined. In some embodiments, urgency may be determined based on features in the information item and/or contextual information (such as date/time features, keywords such as "urgent," for example, or other features as described herein). In some embodiments, urgency may be used for scheduling presentation of the information item to the user, such as via a notification, and the formatting of the notification, as described previously. Additional details for determining urgency regarding an information item are provided in connection to urgency analyzer 289 in FIG. 2A.

At step 560, based at least on the urgency, the information item is provided to the user. Embodiments of step 560 provide the information item to the user, such as via a notification, an API where it may be consumed by an application or service for the user or other users, or providing the information to an application or service such as calendar application associated with the user. The urgency may be used for scheduling presentation of the information item (or otherwise providing the information item) to the user, such as described in connection to notification scheduler 264 and notification logic generator 268 of FIG. 2A. In some alternative embodiments of method 500, step 560 provides to the user relevant information item determined in step 530 regardless of urgency, and may or may not determine contextual information (step 540). Thus, some embodiments of method 500 comprise steps 510, 520, 530, and 560, wherein the relevant information item (determined in step 530) is provided to the user.

With reference now to architecture 100, system 200, and methods 400 and 500 (FIGS. 1-2 and 4-5), several additional examples are described for providing to a user personalized information from venues that are of interest to the user. These examples may be carried out using various embodiments of the invention described herein. In a first example, a user visits a store every Tuesday. The store announces via social media that it will close early on Monday. Since this information is not relevant to the user, it is not provided to the user.

In a second example, Ido participates in a painting class every Friday morning. Ido receives a text message on Monday to bring an object to be painted to the next class. A personal assistant service processes the text message and automatically schedules a reminder notification with the message content (information item) for Ido to be presented Thursday evening and again Friday morning.

In a third example, Haim is a member of a charity steering committee that is planning an event. Haim receives many emails from committee members discussing the scheduling of the event. Rather than read through all of the emails, a personal assistant service (or other service) automatically schedules the event onto Haim's calendar.

In a fourth example, Emily is going to fly from a specific airport tomorrow. A news broadcast indicates that there is going to be a strike at the airport tomorrow. So Emily is provided a notification before going to bed recommending that she arrive to the airport early.

In a fifth example, Mike always buys a certain brand of peanut butter. Unfortunately, there is a recall issued for the peanut butter by the manufacturer. Mike receives a notification about the recall, which may be displayed on a home computer hub or smart appliance.

In a sixth example, Lorenzo is visiting (or is approaching the location of) a hardware store that he has visited on several prior occasions. A personal assistant service (or other service) detects this from user data, identifies a recent email form the store that included a coupon, and automatically provides it to Lorenzo.

In a seventh example, Dikla has a son in the second grade. A personal assistant service infers that Dikla has a son in the second grade by detecting that Dikla goes to a location corresponding to a school every morning and by contextual information provided from Dikla's user data, including social media, communications, and purchase history. The personal assistant service determines that Dikla likely is interested in the school, and thus begins to monitor the school's official website for information relevant to Dikla. An announcement that the second and third grades are attending a field trip on Friday is determined likely to be relevant to Dikla. So the personal assistant application presents this information to Dikla and schedules a reminder on her calendar. But another announcement that the fourth grade needs to bring in supplies for a craft project would be determined likely not relevant to Dikla, and thus not provided to her.

Accordingly, we have described various aspects of technology directed to systems and methods for providing personalized information to a user from venues of interest to the user. It is understood that various features, sub-combinations, and modifications of the embodiments described herein are of utility and may be employed in other embodiments without reference to other features or sub-combinations. Moreover, the order and sequences of steps shown in the example methods 400 and 500 are not meant to limit the scope of the present invention in any way, and in fact, the steps may occur in a variety of different sequences within embodiments hereof. Such variations and combinations thereof are also contemplated to be within the scope of embodiments of the invention.

Figure 6:
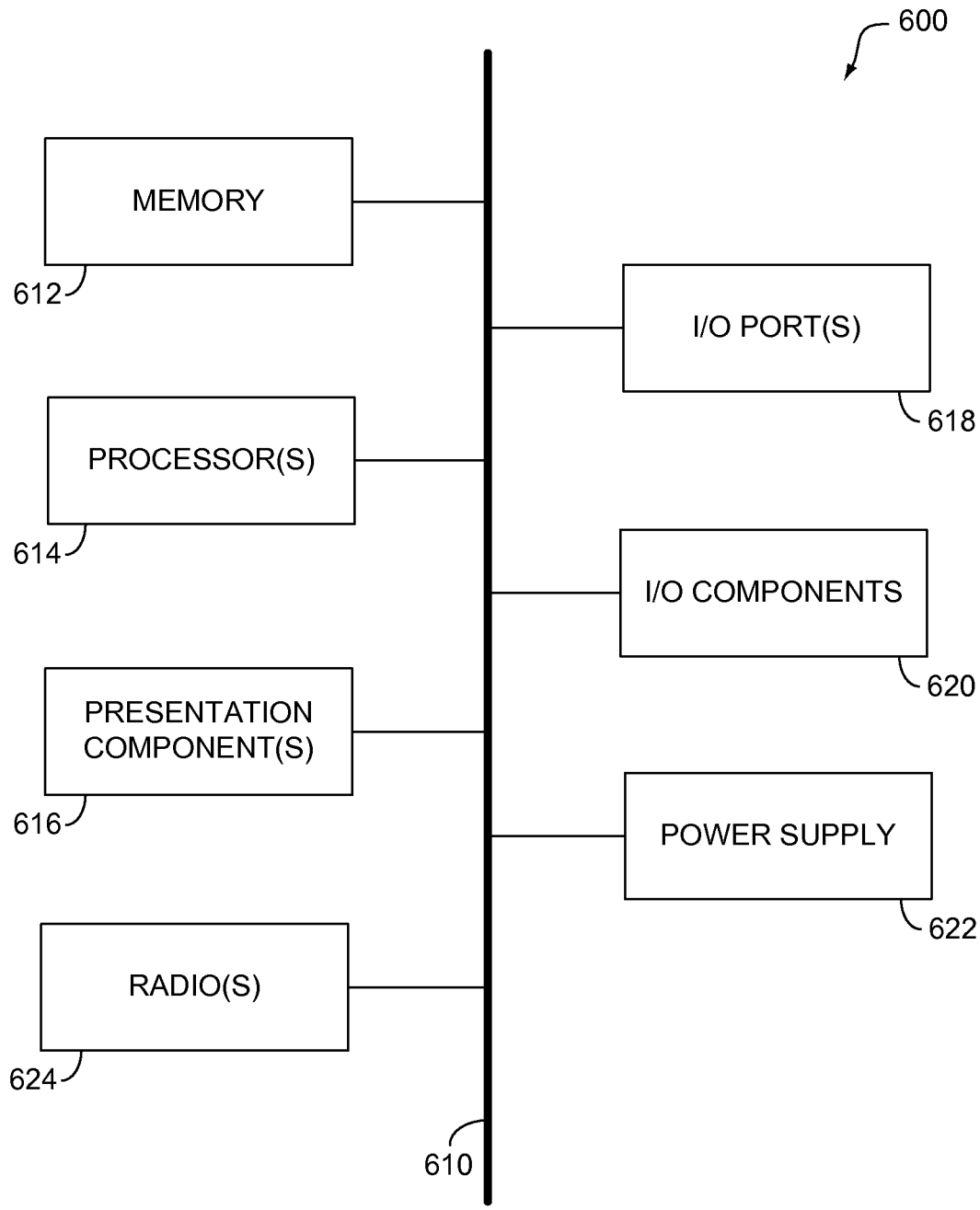
FIG. 6 is a block diagram of an exemplary computing environment suitable for use in implementing an embodiment of the invention.

Having described various embodiments of the invention, an exemplary computing environment suitable for implementing embodiments of the invention is now described. With reference to FIG. 6, an exemplary computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Accordingly, in one aspect, an embodiment of the invention is directed to a computerized system comprising one or more sensors configured to provide sensor data; a venue monitor configured to detect an information item relevant to a user based at least in part on the sensor data; one or more processors; and one or more computer storage media storing computer-useable instructions that, when used by the one or more processors, cause the one or more processors to perform certain operations. These operations include: (a) determining, using the venue monitor, a venue associated with the user, the venue determined based at least in part on the sensor data; (b) determining one or more sources of information for the venue; (c) monitoring the one or more information sources to determine an item of information relevant to the user; and (d) providing the item of information to the user.

In some embodiments of this system, the operations further include determining an urgency score associated with the item of information, and providing the item of information to the user based at least in part on the determined urgency score and determining a schedule for providing the item of information to the user based on the urgency score, wherein the item of information is provided to the user based on the determined schedule; and may further include determining contextual information associated with the item of information, the contextual information determined based at least in part on the sensor data, wherein the urgency score is further determined based in part on the contextual information.

In some embodiments of this system, the operations further include generating notification content for determining a notification, the notification content including the item of information and notification logic specifying a format for presenting a notification for the item of information, and determining a notification according to the generated notification content, wherein providing the item of information to the user comprises presenting the notification on a user device associated with the user, the notification presented according to the notification content.

In another aspect, an embodiment of the invention is directed to a computerized method. The method includes (a) determining a set of venues relevant to the user, the set of venues determined at least in part based on sensor data associated with the user; (b) for a venue in the set of venues, determining one or more sources of information for the venue; (c) determining an information item from at least one source of information for the venue; and (d) determining the relevance of the information item to the user. The method further includes: based on an evaluation of the determined relevance of the information item, if the information item is relevant to the user, then: (1) generating notification content based on the information item, if the information item is relevant; and (2) presenting a notification according to the notification content, the notification including the information item. But if the information item is not relevant to the user, then the method includes not providing the information item to the user.

In yet another aspect, an embodiment of the invention is directed to a computerized system comprising one or more sensors configured to provide sensor data; a venue-information clearinghouse configured for receiving venue information from a set of venues and for making the received venue information accessible to a personal assistant service; a venue monitor configured to detect an information item relevant to a user based at least in part on the sensor data; one or more processors; and one or more computer storage media storing computer-useable instructions that, when used by the one or more processors, cause the one or more processors to perform certain operations. These operations include: (a) monitoring the venue information accessible via the clearinghouse to determine an item of information relevant to the user, wherein the item of information is determined to be relevant based at least in part on the sensor data, and (b) providing the item of information to the user.

What is claimed is:

1. A computerized system, comprising:
   one or more sensors configured to provide sensor data from one or more user computing devices associated with a user;
   a venue monitor configured to monitor user data to determine a pattern of user interactions by the user with one or more venues, wherein the user data comprises the sensor data from the one or more user computing devices associated with the user,
   one or more processors; and
   one or more computer storage media storing computer-useable instructions that, when used by the one or more processors, cause the one or more processors to perform operations comprising:
   determining, using the venue monitor, a venue that is relevant to the user, the venue is determined based at least in part on using the sensor data from the one or more user computing devices associated with the user to determine a pattern of interactions with the venue by the user, wherein the pattern of interactions with the venue comprises a pattern including at least one day and at least one time of day;
   determining one or more sources of information for the venue, wherein the one or more sources of information provide items of information that are associated with the venue;
   monitoring the one or more information sources to determine, from the items of information, an item of information relevant to the user, the item of information comprising features indicating at least one day and at least one time of day;
   determining a relevance of the item of information to the user is based on:
   identifying a first set of features in the pattern of interactions with the venue by the user, the first set of features comprising at least one day and at least one time;

identifying a second set of features in the item of information to the user, the second set of features comprising at least one day and at least one time; and comparing the first set of features corresponding to the pattern of interactions with the venue by the user to the second set of features corresponding to a change in open hours of the venue identified in the item of information; and based on determining the relevance of the item of information to the user, providing a notification of the item of information associated with the change in open hours of the venue.

2. The computerized system of claim 1, further comprising prioritizing providing the notification based on:

determining, for the relevance of the item of information, a relevance score associated with the item of information, wherein determining the relevance score is based at least in part on a user knowledge base associated with the pattern including at least one day and at least one time of day;

determining, for an urgency of the item of information, an urgency score associated with the item of information, wherein determining the urgency score is based on date features and time features in the item of information and the pattern including at least one day and at least one time of day; and providing the notification from the plurality of notifications over a second notification from the plurality of notifications based on both the relevance score and the urgency score of the item of information.

3. The computerized system of claim 2, further comprising determining contextual information associated with the item of information, the contextual information determined based at least in part on the sensor data, wherein the urgency score is further determined based in part on the contextual information.

4. The computerized system of claim 3, further comprising determining a schedule for providing the item of information to the user based on the urgency score, wherein the item of information is provided to the user based on the determined schedule.

5. The computerized system of claim 2, wherein determining the relevance and the urgency of the item of information to the user comprises extracting a set of features comprising relevance-related features and urgency-related features from the item of information and comparing the relevance-related features and the urgency-related features to semantic knowledge of the user associated with the pattern including at least one day and at least one time of day.

6. The computerized system of claim 1, further comprising generating notification content for determining a notification, the notification content including the item of information and notification logic specifying a format for presenting a notification for the item of information; wherein the notification logic is generated based on a notification schedule, wherein the notification logic based on the schedule indicates how much supplemental content should be included in the notification.

7. The computerized system of claim 1, further comprising determining semantic knowledge of the user from the sensor data, and wherein the determined semantic knowledge of the user is used for determining an item of information relevant to the user.

8. The computerized system of claim 1, wherein providing the notification of the item of information relevant to the user includes providing supplemental content to assist the user in addressing the relevant item of information, the supplemental content comprising an indication of one or more alternative venues.

9. The computerized system of claim 1, wherein monitoring the one or more information sources to determine an item of information relevant to the user comprises determining a composite item of information by conflating information from two or more information sources.

10. The computerized system of claim 1, wherein determining the item of information relevant to the user is based in part on a user-provided relevance setting.

11. The computerized system of claim 1, wherein providing the notification of the item of information comprises generation of a notification interface comprising the venue, contextual information, and a relevance score or urgency score, and scheduling information associated with subsequently providing the notification.

12. The computerized system of claim 1, wherein providing the notification of the item of information comprises causing generation of a notification interface comprising the venue and the features extracted from the item of information indicating at least one day and at least one time of day.

13. A computerized method for providing personalized information to a user from one or more venues that are of interest to the user, the method comprising:

monitoring user data to determine a pattern of user interactions by the user with the one or more venues, wherein the pattern of interactions is based on repeated interactions with the one or more venues over time, wherein the pattern of interactions with each venue comprises a pattern including at least one day and at least one time of day, wherein the user data comprises sensor data from user computing devices associated with the user, and wherein each venue comprises an entity that is associated with information or announcements via one or more information sources;

determining a set of venues relevant to the user, the set of venues determined at least in part based on the pattern of user interactions with each venue by the user, determined from the sensor data associated with the user;

for a venue in the set of venues, determining one or more sources of information for the venue, wherein the one or more sources of information provide items of information that are associated with the venue;

determining, from the items of information, an item of information that is associated with at least one source of information by the venue;

determining a relevance of the item of information to the user, wherein determining the relevance of the item information is based on comparing the pattern of interactions with the venue by the user including at least one day and at least one time of day to the corresponding extracted relevance-related features in the item of information including at least one day and at least one time of day corresponding to a change in open hours of the venue identified in the item of information;

determining an urgency of the item of information to the user, wherein determining the urgency of the item information is based on comparing the pattern of interactions with the venue by the user to extracted urgency-related features in the item of information; and based on determining that the item of information is relevant to the user and the urgency of the item of information, providing a notification of the item of information associated with the change in open hours of the venue and the urgency.

14. The computerized method of claim 13, wherein determining the relevance and the urgency of the item of information to the user comprises extracting a set of features comprising relevance-related features and the urgency-related features from the item of information and comparing the relevance-related features and the urgency-relate d features to semantic knowledge of the user.

15. The computerized method of claim 13, wherein the relevance of the item of information to the user is determined at least in part based on an indication, provided by the user, of relevance of the information source from which the information item is determined.

16. The computerized method of claim 13, wherein determining the relevance and the urgency of the item of information to the user comprises determining a relevance score and an urgency score associated with the information item, and wherein the evaluation of the relevance and the urgency comprises comparing the relevance score and urgency score to a relevance threshold and an urgency threshold respectively, wherein the information item is determined relevant and urgent if the corresponding thresholds are satisfied.

17. The computerized method of claim 16, wherein the relevance threshold and the urgency threshold are inferred from user data associated with other users or is determined based on user preferences.

18. A computerized system comprising:
one or more sensors configured to provide sensor data associated with one or more user devices of the user;
a venue-information clearinghouse configured for receiving venue information published by a set of venues and for making the received venue information accessible to a personal assistant service, wherein the venue-information clearinghouse provides an application programming interface (API) to each venue, and wherein the venue-information clearinghouse receives the venue information from each venue by way of the API;
a data store configured to store clearinghouse account information comprising accounts for the venues that use the venue-information clearinghouse, and user accounts for facilitating access to the venue information by the user;
a venue monitor configured to monitor user data to determine a pattern of user interactions by the user with one or more venues,
wherein the pattern of interactions is based on repeated interactions with the one or more venues over time, wherein the pattern of interactions with each venue comprises a pattern including at least one day and at least one time of day,
wherein the user data comprises sensor data from user computing devices associated with the user, and wherein each venue comprises an entity that is associated with information or announcements via one or more information sources;
the venue monitor further configured to determine one or more venues relevant to the user based on the patterns of interactions, to monitor information items published by the one or more venues;
one or more processors; and
one or more computer storage media storing computer-useable instructions that, when used by the one or more processors, cause the one or more processors to perform operations comprising:
monitoring the published venue information accessible via the clearinghouse to determine, from the information items, an item of information published by a venue and a relevance to the user, wherein determining the relevance of the item of information is based at least in part on the sensor data and comparing a first set of features of the pattern of interactions with the venue by the user including at least one day and at least one time of day to a second set of features corresponding to features in the item of information including at least one day and at least one time of day corresponding to a change in open hours of the venue identified in the item of information; and
providing a notification of the item of information associated with the change in open hours of the venue.

19. The computerized system of claim 18, further comprising prioritizing providing the notification based on:
determining, for the relevance of the item of information, a relevance score associated with the item of information, wherein determining the relevance score is based at least in part on a user knowledge base associated with the pattern including at least one day and at least one time of day;
determining, for the urgency of the item of information, an urgency score associated with the item of information, wherein determining the urgency score is based on date features and time features in the item of information and the pattern including at least one day and at least one time of day; and
providing the notification from the plurality of notifications over a second notification from the plurality of notifications based on both the relevance score and the urgency score of the item of information.

20. The computerized method of claim 19, wherein determining the relevance and the urgency of the item of information to the user comprises extracting a set of features comprising relevance-related features and urgency-related features from the item of information and comparing the relevance-related features and the urgency-related features to semantic knowledge of the user associated with the pattern including at least one day and at least one time of day.

* * * * *